(12) United States Patent
Chang et al.

(10) Patent No.: US 10,435,528 B2
(45) Date of Patent: Oct. 8, 2019

(54) HIGH-CAPACITY ANION EXCHANGE MATERIALS

(71) Applicant: AquaNano LLC, Monrovia, CA (US)

(72) Inventors: Han-Ting Chang, Livermore, CA (US); Mamadou Samba Diallo, Pasadena, CA (US); Daniel Sanchez, Pasadena, CA (US); Changjun Yu, Pasadena, CA (US)

(73) Assignee: AquaNano LLC, Monrovia, CA (US)

( * ) Notice: Subject to any disclaimer, the term of this patent is extended or adjusted under 35 U.S.C. 154(b) by 1062 days.

(21) Appl. No.: 14/488,855

(22) Filed: Sep. 17, 2014

(65) Prior Publication Data

US 2015/0076072 A1   Mar. 19, 2015

Related U.S. Application Data

(60) Provisional application No. 61/878,611, filed on Sep. 17, 2013.

(51) Int. Cl.
*C08J 5/20* (2006.01)
*C02F 1/42* (2006.01)
(Continued)

(52) U.S. Cl.
CPC .............. *C08J 5/20* (2013.01); *B01J 41/04* (2013.01); *B01J 41/05* (2017.01); *B01J 41/07* (2017.01);
(Continued)

(58) Field of Classification Search
CPC .. C08G 73/02; C08G 73/022; C08G 73/0206; C08G 73/0226; C08L 79/02; B01J 41/04;
(Continued)

(56) References Cited

U.S. PATENT DOCUMENTS 2,898,309 A   8/1959   Greer
3,092,617 A * 6/1963   Feldt ............... C08G 73/022
                                                   521/25
(Continued)

FOREIGN PATENT DOCUMENTS

CN   102085469 A  *  6/2011
GB       628821       9/1949
(Continued)

OTHER PUBLICATIONS

Machine translation of CN 102085469 A.*
(Continued)

*Primary Examiner* — Kregg T Brooks
(74) *Attorney, Agent, or Firm* — Armstrong Teasdale LLP

(57) ABSTRACT

The present disclosure is directed to polymeric beads, methods of making the beads, and methods of using the beads as high-capacity anion exchange materials. In particular, the disclosure provides polymeric beads comprising a cross-linked polyamine and having a crush strength of about 250 g/bead or more. Preferably, the beads are substantially spherical. Also disclosed are polymeric beads comprising a cross-linked polyamine that has a substantial number of both strong base sites and weak base sites. Methods of using the polymeric beads in various industrial applications, such as groundwater remediation, radio waste management, municipal wastewater management, demineralization, toxin removal, mining, food refinery, research, agriculture, and the like, are also disclosed herein.

25 Claims, 12 Drawing Sheets

(51) Int. Cl.

| | |
|---|---|
| *C08L 79/02* | (2006.01) |
| *C08G 73/02* | (2006.01) |
| *B01J 41/04* | (2017.01) |
| *B01J 41/05* | (2017.01) |
| *B01J 41/07* | (2017.01) |
| *B01J 41/13* | (2017.01) |
| *C02F 101/22* | (2006.01) |
| *C02F 101/16* | (2006.01) |
| *C02F 101/12* | (2006.01) |
| *C02F 103/06* | (2006.01) |

(52) U.S. Cl.
CPC ............... *B01J 41/13* (2017.01); *C02F 1/42* (2013.01); *C08G 73/02* (2013.01); *C08G 73/022* (2013.01); *C08G 73/0206* (2013.01); *C08G 73/0226* (2013.01); *C08L 79/02* (2013.01); *C02F 2001/422* (2013.01); *C02F 2101/12* (2013.01); *C02F 2101/163* (2013.01); *C02F 2101/22* (2013.01); *C02F 2103/06* (2013.01); *C08J 2379/02* (2013.01); *Y10T 428/2982* (2015.01)

(58) Field of Classification Search
CPC ... B01J 41/05; B01J 41/07; B01J 41/12; B01J 41/13; C08J 5/2256; C08J 5/20; C02F 1/42

See application file for complete search history.

(56) References Cited

U.S. PATENT DOCUMENTS

| | | | |
|---|---|---|---|
| 3,210,299 | A | 10/1965 | Hagge et al. |
| 3,414,510 | A * | 12/1968 | Oberbofer ............ C01G 37/003 210/684 |
| 3,803,237 | A | 4/1974 | Lednicer et al. |
| 4,195,138 | A | 3/1980 | Ward |
| 4,427,794 | A | 1/1984 | Lange et al. |
| 5,985,938 | A | 11/1999 | Holmes-Farley et al. |
| 7,459,502 | B2 | 12/2008 | Connor et al. |
| 2004/0178385 | A1 | 9/2004 | Bispo et al. |
| 2013/0022570 | A1 | 1/2013 | Kopping et al. |
| 2013/0118986 | A1 | 5/2013 | Diallo et al. |
| 2014/0158630 | A1 | 6/2014 | Diallo et al. |

FOREIGN PATENT DOCUMENTS

| | | |
|---|---|---|
| GB | 1079670 | 8/1967 |
| GB | 1283873 | 8/1972 |
| WO | 2013103909 A1 | 7/2013 |

OTHER PUBLICATIONS

International Search Report and Written Opinion from PCT/US2015/021209 dated Aug. 5, 2015, 15 pages.

Chen, et al., "Branched Polymeric Media: Perchlorate-Selective Resins from Hyperbranched Polyethyleneimine," Environmental Science and Technology, 2012, vol. 46(19), pp. 10718-10726.

Mishra, et al., "Branched Polymeric Media: Boron-Chelating Resins from Hyperbranched Polyethyleneimine," Environmental Science and Technology, 2012, vol. 46 (16), pp. 8998-9004.

Barth, et al., "Reversible Cross-Linking of Hyperbranched Polymers: A Strategy for the Combinatorial Decoration of Multivalent Scaffolds," Angew. Chem. Int. Ed., 2005, vol. 44, pp. 1560-1563.

Rademann, et al., "ULTRA Loaded Resins Based on the Cross-Linking of Linear Poly(ethylene imine). Improving the Atom Economy of Polymer-Supported Chemistry," Angew. Chem. Int. Ed., 2002, vol. 41(16), pp. 2975-2978.

Shepherd, et al., "Studies of a Cross-linked Poly(ethyleneimine) Ion-exchange Resin," Journal of the Chemical Society (Resumed), 1957, pp. 86-92.

Roice, et al., "Ultramine: A High-Capacity Polyethylene-Imine-Based Polymer and Its Application as a Scavenger Resin," Chem. Eur. J., 2004, vol. 10, pp. 4407-4415.

Rivas, et al., "Branched and linear polyethyleneimine supports for resins with retention properties for copper and uranium," Journal of Applied Polymer Science, 1989, vol. 38(5), pp. 801-807.

Rivas, et al., "Synthesis and metal complexation of poly(ethyleneimine) and derivatives," Advances in Polymer Science, 1992, vol. 102, pp. 171-188.

Invitation to pay additional fees and Partial International Search Report from PCT/US2014/056085, dated Nov. 27, 2014.

"Dowex Ion Exchange Resins, Fundamentals of Ion Exchange", available at http://msdssearch.dow.com/PublishedLiteratureDOWCOM/dh_0032/0901b803800326ca.pdf (2000).

* cited by examiner

HIGH-CAPACITY ANION EXCHANGE MATERIALS

CROSS REFERENCE TO RELATED APPLICATIONS

This application claims priority from U.S. Provisional Patent Application Ser. No. 61/878,611 filed Sep. 17, 2013, which is hereby incorporated by reference in its entirety.

BACKGROUND OF THE DISCLOSURE

The present disclosure is directed to polymeric beads, methods of making the beads, and methods of using the beads as high-capacity anion exchange materials. In particular, the disclosure provides polymeric beads comprising a cross-linked polyamine and having a crush strength of about 250 g/bead or more. Preferably, the beads are substantially spherical. Also disclosed are polymeric beads comprising a cross-linked polyamine that has a substantial number of both strong base sites and weak base sites. Methods of using the polymeric beads in various industrial applications to remove or collect an unwanted or target ion, such as groundwater remediation, radio waste management, municipal wastewater management, demineralization, toxin removal, mining, food refinery, research, agriculture, and the like, are also disclosed herein.

Anion exchange resins are widely used in industry to remove or trap unwanted or target anions from an aqueous medium. Currently, commercial anion exchange resins are primarily made out of cross-linked styrene-divinyl benzene and acrylic type polymers, whose capacity are limited by their inherent low nitrogen content (e.g., 1.4 eq/L for a strong base resin and 2.0 eq/L for a weak base resin). It is desirable to obtain high-capacity resins for improving existing applications and that hold promise for use in new applications.

High capacity materials have been previously disclosed (see, e.g., U.S. Pat. No. 3,210,299) and are commercially available (e.g., Purolite® S106 and Resintech® SIR-700), but such high capacity materials have not been disclosed in bead form. Bead morphology plays an important role in many ion exchange applications. In particular, mechanical abrasion and compression during use can put pressure on a bead, and result in bead deformation, fracture, chipping, and/or crushing. This is particularly problematic for beads that do not have a spherical morphology, as edges of the beads are more susceptible to chipping and fracture. In addition, a spherical bead morphology better reduces the pressure drop, and resists osmotic pressure, during repetitive expansions and contractions that occur during bead use, and produces a better elution profile, and thus better separation, than irregularly shaped materials. It is thus desirable for an ion exchange bead to be as close to spherical as possible.

In order to be better suited for use in industrial or commercial-scale water treatment or ion exchange applications, it is also important for the crush strength of the bead to be sufficiently high, such that the bead does not deform, chip, or crush under pressures common in these applications. Although some have reported the preparation of polymeric beads made from high density nitrogen oligomers or polymers with various cross-linkers in an inverse suspension process (see, e.g., U.S. Pat. Nos. 3,803,237 and 7,459,502, as well as articles by Diallo, et al., *Environmental Science and Technology*, 46 (19). pp. 10718-10726, and *Environmental Science and Technology*, 46 (16). pp. 8998-9004), the compositions disclosed or prepared therein do not possess a crush strength sufficiently high to be suitable for use in such industrial applications. Thus, there continues to be a need to develop high-capacity, ion exchange materials that meet these industrial mechanical strength requirements.

BRIEF DESCRIPTION OF THE DISCLOSURE

In one embodiment, the present disclosure is directed to a substantially spherical polymeric bead comprising a cross-linked polyamine, wherein: i) the bead has a crush strength of about 250 g/bead or more; ii) the cross-linked polyamine is the reaction product of a polyamine and an amine-reacting crosslinking agent; and iii) the bead has a weak base capacity of at least about 2.3 eq/L.

In another embodiment, the present disclosure is directed to a substantially spherical polymeric bead comprising a cross-linked polyamine, wherein: i) the bead has a crush strength of about 250 g/bead or more; ii) the cross-linked polyamine is a reaction product of a polyamine and an amine-reacting crosslinking agent; and iii) the bead is a reaction product of the cross-linked polyamine and an amine-reacting moiety.

In another embodiment, the present disclosure is directed to a polymeric bead comprising a cross-linked polyamine, wherein: i) at least 30% of the amine sites in the cross-linked polyamine are strong base sites; ii) at least 30% of the amine sites in the cross-linked polyamine are weak base sites; and iii) the bead is capable of binding and concentrating a high-valent oxidative ion, and reducing the high-valent oxidative ion to a low-valent ion. Methods for removing an ion from an aqueous solution comprising contacting the aqueous solution with a plurality of these beads are also disclosed.

In another embodiment, the present disclosure is directed to a method for preparing a polymeric bead comprising a cross-linked polyamine and having a crush strength of about 250 g/bead or more, the method comprising: i) introducing an amine solution comprising a polyamine into a continuous phase comprising a hydrophobic solvent and a surfactant over a period of from about 5 minutes to about 60 minutes to form a reaction solution, ii) introducing a crosslinking agent into the reaction solution at a temperature of from about 15° C. to about 45° C. over a period of from about 0.5 to about 10 hours, and iii) after addition of the crosslinking agent, maintaining the temperature of the reaction solution at from about 30° C. to about 100° C. for from about 3 to about 24 hours.

In another embodiment, the present disclosure is directed to a method for removing a target ion from an aqueous solution, the method comprising contacting the aqueous solution with a plurality of the beads of the present disclosure.

In yet another embodiment, the present disclosure is directed to a continuous method of reducing a concentration of a target ion from a polluted aqueous solution stream on an industrial scale, the method comprising: i) contacting the aqueous solution and a fixed bed comprising a plurality of ion binding beads of the present disclosure for a time period sufficient to reduce the concentration of the target ion in the aqueous solution and produce an aqueous solution product stream; and, ii) collecting a product selected from the group consisting of the aqueous solution product stream and the target ion.

DETAILED DESCRIPTION OF THE DISCLOSURE

Figure 1:
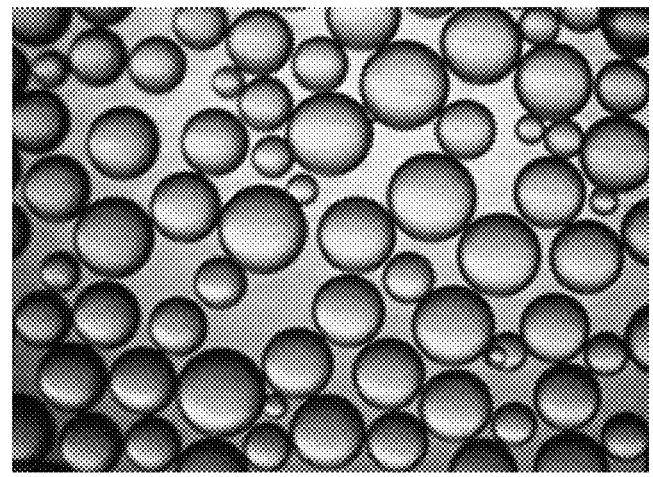
FIG. 1 is an image of polymeric beads of the present disclosure (about 600 micron, average size) comprising 10% strong base sites and 90% weak base sites, as described in Example 18.

The present disclosure is directed to anion-binding polymeric materials that have a high crush strength and are sufficient for use in various industrial or commercial-scale ion binding applications. In particular, the polymeric materials of the present disclosure are in the form of polymeric beads that have a crush strength of about 250 g/bead or more. The polymeric materials may also be characterized as having one or more of the following properties, which are further detailed and discussed herein below: substantially spherical bead morphology; about 90% or more whole bead; high ion binding capacity; and/or a diameter of about 250 µm or more. The polymers may optionally be further functionalized with an amine-reacting moiety to increase the strong base capacity of the beads and/or to introduce onto the polymers a functional group that has binding specificity or action for a particular target anion. Since the polymeric beads have a high crush strength, they are suitable for use in industrial or commercial-scale water treatment applications, which may involve transport and loading of large quantities of beads by mechanical pumping.

Thus, in another aspect, the present disclosure is directed to methods for removing unwanted or target ions from an aqueous solution using the polymeric beads of the invention. In particular, since the polymeric beads of the invention have a high crush strength, they are suitable for use in industrial or commercial-scale water treatment applications, such as groundwater remediation, radio waste management, municipal wastewater management, demineralization, toxin removal, mining, food refinery, agriculture, research, and the like. In one particular aspect, the present disclosure is directed to a method for reducing a concentration of a pollutant or target ion from a polluted aqueous solution stream on an industrial or commercial-scale.

In another aspect, the present disclosure is directed to methods for preparing a polymeric bead of the invention. In particular, the beads may be formed by reacting (i.e., cross-linking) a polyamine with an amine-reacting crosslinking agent to form polymeric beads comprising a cross-linked network. It has been discovered that reaction conditions, such as reaction temperature, order of reagent addition, ratio of crosslinking agent to polyamine, rate of addition of crosslinking agent and/or polyamine, and/or the degree of protonation of the polyamine prior to reaction with the crosslinking agent may affect the crush strength and/or sphericity of the beads. For instance, it has been discovered that by lowering the temperature of the reaction, slowing the rate of addition of crosslinking agent and polyamine, and/or increasing the amount of crosslinking agent relative to the amount of polyamine, the crush strength can be increased and a more spherical bead can be obtained, as compared to polymeric materials made from similar polyamine starting materials. Also disclosed are methods for preparing a functionalized ion binding bead having a high crush strength and strong base capacity.

In another aspect, the present disclosure is directed to anion-binding polymeric materials that have a substantial number of strong base sites and a substantial number of weak base sites. In particular, these beads (also referred to herein as "dual function beads") comprise a cross-linked polyamine, wherein at least 30% of the amine sites in the cross-linked polyamine are strong base sites and at least 30% of the amine sites in the cross-linked polyamine are weak base sites. Advantageously, the bead is capable of both binding and concentrating high-valent oxidative ions, and also reducing the high-valent oxidative ion to a low-valent ion, even under unfavorable conditions, such as a pH of 7 or above. These beads are particularly suitable for use in water treatment applications, such as groundwater treatment. In one particular embodiment, the beads may be used in removal of chromium (VI) ions from an aqueous solution (e.g., groundwater) and conversion of chromium (VI) ions to chromium (III) ions. Methods for making beads comprising a substantial number of weak base sites and a substantial number of strong base sites are also disclosed.

I. POLYMERIC BEADS

The polymeric materials of the invention are characterized by their ability to bind ions. Preferably, the polymers of the invention bind anions, including but not limited to chloride, bromide, iodide, iodate, perchlorate, pertechnetate, sulfate, nitrate, phosphates, chromium ions, uranium ions, arsenic, selenite, selenite, and combinations thereof. For illustration, anion-binding polymers, and especially chromate-binding polymers, will be described; however, it is understood that this description applies equally, with appropriate modifications that will be apparent to those of skill in the art, to all ions and solutes. As used herein, a polymer "binds" an ion, e.g. an anion, or is an "ion-binding" polymer (e.g., a "chromate-binding" polymer) when it associates with the ion, generally though not necessarily in a non-covalent manner, with sufficient association strength that at least a portion of the ion remains bound under the operating conditions in which the polymer is used for sufficient time to effect a removal of the ion from a fluid. A "target ion" is an ion to which the polymer binds and that is to be removed from a fluid. A polymer may have more than one target ion. The polymers of the invention are advantageously in bead form, and thus are also referred to herein as a "bead", a "polymeric bead", or an "ion binding bead".

A. Bead Properties

In some embodiments, the polymeric beads of the invention are characterized by a high crush strength, in particular, a crush strength of about 250 g/bead or more. The polymeric beads may further be characterized by one or more of the following properties: (i) substantially spherical bead morphology; (ii) about 90% or more whole bead; (iii) high ion binding capacity; (iv) a combination of strong base sites and weak base sites (e.g., wherein at least about 5% of the amine sites in the polymer are strong base sites, and at least about 15% of the amine sites in the polymer are weak base sites); and/or (v) a diameter of about 250 μm or more. The polymeric beads are composed of cross-linked polyamines that are the reaction product of a polyamine and an amine-reacting crosslinking agent.

In other embodiments, the polymeric beads of the invention are cross-linked polyamines that are characterized by comprising a substantial number of strong base sites and a substantial number of weak base sites. More particularly, in these embodiments, at least 30% of the amine sites in the cross-linked polyamine are strong base sites and at least 30% of the amine sites in the cross-linked polyamine are weak base sites. These beads may further be characterized by one or more of the following properties: (i) crush strength of about 250 g/bead or more; (ii) substantially spherical bead morphology; (iii) about 90% or more whole bead; (iv) high ion binding capacity; and/or (v) a diameter of about 250 μm or more. The cross-linked polyamines are the reaction product of a polyamine and an amine-reacting crosslinking agent or the reaction product of an amine-reacting moiety and an anion resin (e.g., a styrene-divinyl benzene anion resin, an acrylic anion resin, or a phenol-formaldehyde anion resin).

1. Crush Strength

The term "crush strength" is used herein interchangeably with the terms "gel strength" and "friability". Crush strength relates to the tendency of the polymeric beads to resist deformation and to maintain their integrity under an applied stress or pressure. More specifically, the term "crush strength" as used herein refers to the mechanical load required to break, fracture, or crack an individual polymeric bead.

In many industrial water treatment and ion exchange applications, ion exchange beads are subjected to mechanical abrasion and/or high pressures and stresses. For instance, many industrial ion exchange applications use large volumes of beads that are pumped into and out of ion exchange towers. Beads at the bottom of the tower may be subjected to extremely high pressures, which may fracture or crack the beads, particularly beads having a low crush strength. The beads are also subjected to significant mechanical abrasion as they are pumped into and out of the towers, which applies stress to the beads. Other industrial ion exchange applications use beads in connection with pressurized vessels and/or subject the beads to repeated exhaustion and regeneration cycles, which tends to fracture beads. Thus, in order to be suitable for use in many industrial water treatment and ion exchange applications, the crush strength of the polymeric beads needs to be high enough so that the beads do not readily or easily deform, chip, crush, or fracture under pressures common in such applications. The polymeric beads of the disclosure advantageously have a high crush strength, and thus are suitable for use in industrial applications.

In particular, the polymeric beads of the present disclosure may have a crush strength of about 250 g/bead or more. In particular embodiments, the polymeric beads may have a crush strength of from about 250 g/bead to about 1000 g/bead, or from about 250 g/bead to about 750 g/bead, or from about 250 g/bead to about 500 g/bead. In some embodiments, the crush strength of the polymeric beads is less than about 5000 g/bead. Preferably, the polymeric beads of the present disclosure have a crush strength of about 300 g/bead.

Crush strength may be measured using any suitable force measurement apparatus. Preferably, crush strength is measured using a force measurement apparatus available from John Chatillon and Sons (New York, N.Y.). This instrument measures the force (grams) required to crack or fracture a polymeric bead when it is placed between two parallel plates. The plates are gradually brought together at a uniform rate until the bead "breakpoint" (i.e., the point at which the bead cracks or fractures) is reached. The purpose of this test (referred to herein as the "Chatillon test") is to simulate the frictional and pressure forces exerted on individual polymeric beads under actual use conditions.

In order to test the crush strength of the beads using the Chatillon test, the polymeric beads are first converted into the chloride form by well-known standard procedures. The converted beads are screened to a 30/40 U.S. mesh cut size and then allowed to fully hydrate in de-ionized water for at least 15 minutes prior to testing. Actual testing is done on a single bead (covered by a small drop of water) in the Chatillon instrument using the lowest practical speed of descent of the crushing plate. The fragmentation forces are recorded from the instrument in grams per bead.

Crush strength of the polymeric beads may be determined by a number of factors, including the nature of the polyamine, the nature of the crosslinking agent, the concentration of polyamine in the discrete phase, the ratio of crosslinking agent to polyamine (referred to herein as "crosslinking density"), crosslinking homogeneity, temperature of the reaction, and rate of addition of the crosslinking agent during the crosslinking reaction. These factors are discussed in detail hereinafter.

The dual function beads of the present disclosure may optionally have a crush strength as set forth herein.

2. Bead Morphology

Bead morphology plays a role in many ion exchange applications. In particular, mechanical abrasion and compression during use exerts pressure on a bead, and can result in bead deformation, fracture, chipping, and/or crushing of the bead. This is particularly problematic for beads that do not have a spherical morphology, as edges of the beads are more susceptible to chipping and fracture. In addition, a spherical bead morphology better reduces the pressure drop, and resists osmotic pressure, during repetitive expansions and contractions that occur during bead use, and/or results in a better elution profile, and thus better separation. It is therefore desirable for ion exchange bead to be as spherical, and uniform, as possible.

Thus, the polymeric beads of the present invention are preferably substantially spherical beads. As used herein, the term "substantially" means generally rounded beads having an average aspect ratio of about 1.0 to about 1.5. Aspect ratio is the ratio of the largest linear dimension of a bead to the smallest linear dimension of the bead. Aspect ratios may be easily determined by those of ordinary skill in the art. This definition includes spherical beads, which by definition have an aspect ratio of 1.0. In some embodiments, the beads have an average aspect ratio of about 1.0, 1.1, 1.3, or 1.5. The beads may be round or elliptical when observed under a microscope with a scale in the background.

The polymeric beads preferably will have a sphericity of about 90%, about 95%, or even about 100%. As used herein, the term "sphericity" refers to the roundness of the beads, and more specifically, refers to the percentage of beads in a population of beads that have an aspect ratio of less than 1.5, more preferably less than 1.2, and even more preferably less than 1.1. The sphericity of the beads may be measured by using a microscope and counting an average of 10 to 20 beads which have an aspect ratio of less than 1.5.

In addition to substantially spherical morphology, the beads of the present disclosure will preferably have minimal amounts of cracks, inclusions, or breaks, and are characterized by a high percentage of whole bead. As used herein, the term "whole bead" refers to the portion of beads in a population of beads that do not contain cracks or inclusions and are not broken. The term "inclusions" refers to voids present inside the bead. In some aspects, the polymeric beads have about 10% or less inclusions, cracks, and/or breaks, and more particularly have about 5% or less inclusions, cracks, and/or breaks; stated another way, the polymeric beads are about 90% whole bead or more, and more particularly are about 95% whole bead or more. The percent inclusion, cracks, and/or breaks and percent whole bead may be measured by counting under a microscope.

The dual function beads of the present disclosure may optionally be substantially spherical and/or may optionally have the whole bead content set forth herein.

3. Ion Binding Capacity

The polymeric beads described herein exhibit ion binding properties, and generally anion-binding properties. In preferred embodiments, the polymeric beads can bind to chloride, bromide, iodide, iodate, perchlorate, pertechnetate, sulfate, nitrate, phosphates, chromium ions, uranium ions, arsenic, selenite, selenite, gold, silver, molybdenum, nickel, and combinations thereof.

As used herein, the term "ion binding capacity" refers to the mole equivalent of quaternized nitrogen in one liter of beads, and may be expressed as equivalents/liter (eq/L). In some instances, the quaternized nitrogen is permanently quaternized; i.e., the nitrogen is substituted with substituents selected from the group consisting of alkyl, aryl, and combinations thereof, none of which disassociate from the nitrogen when the pH of the liquid is changed. A permanently quaternized nitrogen is referred to here as a "strong base site," and the total moles of strong base site in one liter of beads (expressed as eq/L) is referred to herein as the "strong base capacity" (SBC), or "salt splitting capacity" of the bead.

In other instances, the quaternized nitrogen is not permanently quaternized. In this instance, one or more substituent on the quaternized nitrogen is a proton that may disassociate from the nitrogen, depending on the pH of the liquid; i.e., the degree of quaternization depends on the pH of the liquid. A non-permanently quaternized nitrogen is referred to herein as a "weak base site", and the total mole of weak base sites in one liter of beads (expressed as eq/L) is referred to herein as the "weak base capacity" (WBC) of the bead.

The total ion binding capacity of a polymer is the sum of the mole of strong base sites and mole of weak base sites in one liter of resin (i.e., sum of strong base capacity and weak base capacity). In some aspects, the polymeric beads of the present disclosure may advantageously have an ion binding capacity that is higher than that typically available from known commercial ion exchange resins. This higher ion binding capacity may be a function of a higher weak base capacity and/or a higher strong base capacity.

Ion binding capacities may be measured using the ASTM method D-2187, "Standard Test Methods for Physical and Chemical Properties of Particulate Ion-Exchange Resins."

Weak Base Capacity

In some embodiments, the beads of the present disclosure will have a high weak base capacity. In these embodiments, the weak base capacity of the beads of the present disclosure is preferably at least about 2.3 eq/L, and more preferably from about 2.3 eq/L to about 3.3 eq/L, or from about 2.5 eq/L to about 3.0 eq/L, and more preferably is about 3.0 eq/L. Weak base capacity of the beads disclosed herein is as measured in their chloride form. In some embodiments, the polymeric beads are non-functionalized beads that have a weak base capacity of at least about 2.3 eq/L, and a strong base capacity of less than about 0.4 eq/L.

Strong Base Capacity

In some embodiments, the beads of the present disclosure may be further functionalized to increase the degree of permanent amine quaternization, and thus the strong base capacity, of the polymers. As discussed above, prior to functionalization, some beads of the disclosure may have a strong base capacity of less than about 0.4 eq/L. The cross-linked polyamines may, however, be reacted with one or more amine-reacting moieties, such as those set forth in Tables I, II, and III herein, to increase the strong base capacity of the bead. Preferably, the functionalized polymeric beads of the disclosure have a strong base capacity of at least about 1.5 eq/L, and more preferably from about 1.5 eq/L to about 2.2 eq/L. Preferably, the strong base capacity of the functionalized beads is about 2.0 eq/L. Strong base capacity of the beads disclosed herein is as measured in their chloride form.

Total Capacity

In some embodiments, the total capacity of the functionalized or non-functionalized polymeric beads is preferably from about 2.0 eq/L to about 4.2 eq/L, or from about 2.0 eq/L to about 3.8 eq/L, or from about 2.5 eq/L to about 3.5 eq/L, and more preferably is about 3.0 eq/L, as measured in their chloride form.

Strong Base/Weak Base Mixtures and Dual Function Beads

As discussed herein, both strong base sites and weak base sites are useful for ion-exchange applications. It would therefore be advantageous to provide a resin having both good strong base and good weak base capacity. Current commercial anion exchange resins are classified into strong base anion (SBA) or weak base anion (WBA) resins. The SBA resins typically have less than 5% of the total binding capacity attributable to weak base capacity (i.e., less than 5% of the amine sites in the resin are weak base sites), while the WBA resins typically have less than 10% of the total binding capacity attributable to strong base capacity (i.e., less than 10% of the amine sites in the resin are strong base sites).

Advantageously, the beads of the present disclosure may contain a mixture of SBA and WBA. For instance, in some embodiments, the beads of the present disclosure comprise a cross-linked polyamine, wherein at least 5%, more preferably at least 20%, and more preferably at least 30% of the amine sites in the cross-linked polyamine are strong base sites and at least 15%, more preferably at least 25%, or at least 30% of the amine sites in the cross-linked polyamine are weak base sites. In particular, in some embodiments, the beads of the present disclosure may have from 5% strong base capacity/95% weak base capacity to 85% strong base capacity/15% weak base capacity.

In one particular embodiment, the present disclosure is directed to polymeric beads comprising a substantial number of both strong base sites and weak base sites. These beads, which have properties of both strong base anion resins and weak base anion resins, are referred to herein as dual function beads. Such beads will preferably comprise a cross-linked polyamine, wherein at least 30% of the amine sites in the cross-linked polyamine are strong base sites and at least 30% of the amine sites in the cross-linked polyamine are weak base sites.

In some embodiments, the dual function beads may be a cross-linked polyamine that is the reaction product of a polyamine and an amine-reacting crosslinking agent. Examples of such beads include beads prepared as described herein. In other embodiments, the dual function bead may be a cross-linked polyamine that is the reaction product of an amine-reacting moiety, such as an alkylating agent (e.g., methyl chloride), and an anion resin. Suitable anion resins that may be used to prepare the dual function beads include the reaction product of a polyamine and an amine-reacting crosslinking agent, such as the cross-linked polyamines of the present disclosure (e.g., the dual function bead may be a functionalized bead of the present disclosure). Other suitable anion resins that may be used to prepare the dual function beads include polyamine epoxide anion resins, styrene-divinyl benzene anion resins, acrylic anion resins, or phenol-formaldehyde anion resins. Examples of polyamine epoxide anion resins, styrene-divinyl benzene anion resins, acrylic anion resins, and phenol-formaldehyde anion resins include commercially available resins. As discussed above, in some instances, the dual function beads may be obtained by further partially quaternizing a cross-linked polyamine with an amine-reacting moiety, such as those set forth in Tables II and III herein, to increase the degree of permanent quaternization in the beads. Preferably, the degree of permanent quaternization (i.e., percent of amines that are strong base sites) will range from about 5% to about 85%, and more preferably from about 30% to about 70%.

Partial quaternization of the polymer is desired to maximize removal of desired anions through a mechanism of retain/react action. Specifically, the permanently quaternized sites in the polyamine retain and concentrate the desired ion from a dilute contaminate solution, which facilitates the reaction of the ion with non-quaternized sites in the polyamine, allowing for conversion of the contaminant ion into a non-harmful ion, even under unfavorable conditions such as high pH (e.g., a pH higher than 7). The reaction of the non-quaternized amines with the ion takes advantage of the higher ion concentration and close proximity of the ion that is achieved through retention of the ion by the quaternized sites. This mechanism of action is particularly useful in connection with removal of high-valent oxidative anions such as, but not limited to, chromates, chlorates, and bromates, and is particularly suited for removal of chromium (VI) from contaminated groundwater.

This is exemplified in Examples 155-157 and FIGS. 8, 9, and 11-13. For instance, with specific reference to Example 157 and FIG. 13, in this example, a contaminated groundwater source having a chromium (VI) concentration of about 20 ppb (μg/L) was passed through a bed of crosslinked polyamine beads of the present disclosure having about 50% permanent quaternization. As can be seen from FIG. 13, after the chromium (VI) concentration in the effluent reached 10 ppb, it did not continue to increase to a point where the effluent chromium (VI) concentration was the same as the influent chromium (VI) concentration (which is typical when other conventional strong base anion exchange resins are used). Rather, the concentration of chromium (VI) in the effluent stayed at about 10 ppb—i.e., an equilibrium state was reached.

This phenomena (reaching an equilibrium state) is the result of the conversion of the captured chromium (VI) to chromium (III). As discussed above, the strong base sites present on the bead effectively capture chromium (VI) ions, while non-quaternized weak base sites reduce the chromium (VI) to chromium (III). When the rate of conversion of captured chromium (VI) to chromium (III) is equal to rate of chromium (VI) incoming from the influent, an equilibrium is reached.

The equilibrium concentration (i.e., the concentration of the contaminant ion in the effluent when equilibrium is reached) achievable using the dual functional beads of the present disclosure is preferably at least about 75% of the influent concentration, or at least about 60% of the influent concentration, or at least about 40% of the influent concentration.

This feature of the retain/react mechanism of action allows beads comprising a mix of strong base anion and weak base anion to continue treating water when the equilibrium concentration of the contaminant ion is below a regulated maximum contaminant level (MCL), without the need to regenerate the beads. When the equilibrium concentration of the contaminant in an effluent is still above a regulated MCL, one or more additional treatment vessel comprising beads of the present disclosure can be attached in series to the initial treatment vessel to further reduce the concentration of the contaminant below a regulated MCL. In theory, for any given contaminant level of water, the effluent concentration of the last vessel in series will be equal to the product of the following reaction: (influent concentration)× (percent at equilibrium concentration)$^n$, wherein "percent at equilibrium concentration" is the percent of the influent ion concentration that is in the effluent at equilibrium, and wherein n is the number of vessels. Thus, depending on the influent concentration of the target ion, a treatment system can be designed with one or more treatment vessels in a series to achieve effluent concentrations below a regulated MCL, without need for regeneration of the beads.

In one particular embodiment, from about 15% to about 75%, or preferably from about 30% to about 60%, of the total binding capacity of the bead is from strong base sites (i.e., permanent quaternary amines), with the remaining binding capacity (e.g., about 25% to about 85%, or about 40% to about 70%, attributable to weak base sites (i.e., non-permanently quaternized amines). Such a bead is particularly suited for binding chromium (VI) ions. In particular, the strong base sites present on the bead effectively capture chromium (VI) ions, while weak base sites reduce the chromium (VI) to chromium (III) under conditions where the pH of the contaminated water is above 7, as is typical of most groundwater sources.

Operating Capacity

In some embodiments, the polymeric beads of the disclosure (non-functionalized and functionalized, including dual function beads) may be characterized by their selective binding of anions and high binding capacity, which is commonly known as operating capacity. Operating capacity relates to a specific application, where the target ion of interest is present among other competing ions. The operating capacity is commonly expressed as number of bed volume (BV) treated at a designated breakthrough concentration. Bed volume refers to the volume of the resin (or beads). A designated breakthrough concentration is normally the regulated maximum contaminant level (MCL) (e.g., for California chromium (VI), MCL is 10 parts per billion (ppb)).

Operating capacity can be measured by running contaminate water through a bed of resin until the desired contaminate concentration in the effluent reaches the designated concentration. The volume used is then recorded as a number of bed volume. For instance, if 100 liters of the contaminate water ran through a 10 mL resin bed to reach the designated (breakthrough) concentration, the bed volume would be 10,000.

Since contaminated water sources may differ greatly in ion composition and concentration, only direct side-by-side comparison of the operating capacity of resins (or beads) is meaningful. Advantageously, as compared to the treated bed volume of commonly used SBA resins having a SBC of from 0.8 to 1.4 eq/L, the treated bed volume of the beads of the present disclosure is at least about 1.3 times, or at least about 1.5 times, preferably at least about 2 times, and more preferably at least about 3 times greater. In one embodiment, the beads of the present disclosure have a treated bed volume that is about 2 times that of commonly used resins.

In one specific embodiment, for chromium (VI) treatment, the treated bed volume of the beads of the present disclosure, as compared to the treated bed volume of the commercially available styrene-divinyl benzene-type resins Purolite® 600A and Dow® SAR, is at least about 2 times, more preferably at least about 3 times, and even more preferably at least about 5 times greater. Preferably, the treated bed volume of the beads of the present disclosure is about 3 times greater than that of these commercial resins for chromium (VI) treatment.

In another embodiment, for perchlorate treatment, the treated bed volume of the beads of the present disclosure, as compared to the treated bed volume of commercially available resins Purolite® A532E and Dow® PWA2 or PSR2 at least about 1.3 times, more preferably at least about 1.5 times, and even more preferably at least about 2 times greater. Preferably, the treated bed volume of the beads of the present disclosure is about 1.5 times greater than that of these commercial resins for perchlorate treatment.

In another embodiment, for nitrate treatment, the treated bed volume of the beads of the present disclosure, as compared to the treated bed volume of commercially available resin Purolite® A520E at least about 1.3 times, more preferably at least about 1.5 times, and even more preferably at least about 2 times greater. Preferably, the treated bed volume of the beads of the present disclosure is about 1.5 times greater than that of this commercial resin for nitrate treatment.

4. Bead Diameter

The polymeric beads of the present disclosure preferably have a mean diameter of from about 100 μm to about 1500 μm, preferably from about 250 μm to about 1000 μm, or from about 400 μm to about 1000 μm. Alternatively, the polymeric beads preferably have a mean diameter of about 250 μm or more, or from about 300 μm to about 1500 μm. Preferably, the beads have a diameter of about 350 μm, about 500 μm, about 750 μm, or about 1000 μm.

B. Bead Composition

1. Polyamines

In one aspect, the disclosure provides ion binding polymeric beads that contain cross-linked amine moieties. In particular embodiments, the polymeric beads comprise cross-linked polyamines that are the reaction product of a polyamine and a crosslinking agent. As used herein, the term "polyamine" refers generally to a molecule having more than one amine functional group, including triamines, tetraamines, pentamines, hexamines, amine oligomers, and amine polymers. The polyamine may be a small molecule (e.g., a molecule having a molecular weight of less than 500), oligomer, or polymer.

Any suitable polyamine may be used to form the ion binding, cross-linked polyamines of the invention. In some embodiments, the polyamine may have a number average molecular weight of at least about 150, at least about 5,000, at least about 10,000, or at least about 15,000, and more preferably, of from about 1500 to about 100,000, or from about 2500 to about 50,000, or from about 10,000 to about 30,000.

One polyamine useful to form the polymers of the invention is an amine of formula (I):

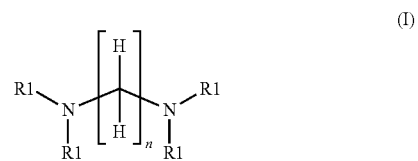

wherein: each n, independently, is from 2-10; and each $R_1$ is independently selected from the group consisting of H, alkyl, aryl, aminoalkyl, and aminoaryl, or is linked to a neighboring $R_1$ to form an alicyclic, aromatic, or heterocyclic group. In some embodiments, the polyamine may be a partially quaternized amine of formula (I).

Suitable exemplary polyamines of formula (I) include, but are not limited to:

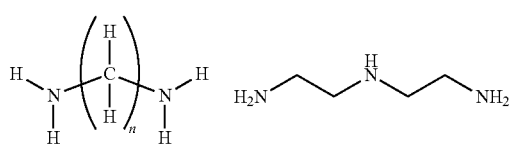

-continued

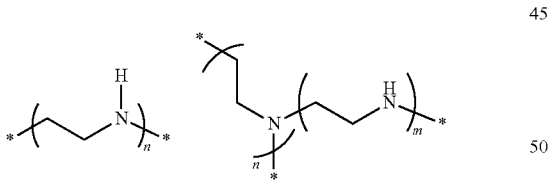

n = 2-10

In another embodiment, the polyamine is a polymer characterized by comprising a repeating unit of formula (II):

(II)

wherein: the polymer is linear or branched; each n, independently, is from 10-2000, preferably from 100-1000, and more preferably from 200-600; and each R is independently selected from the group consisting of H, alkyl, aryl, aminoalkyl, aminoaryl, and an amine of formula (II). In some embodiments, the polyamine may be a partially quaternized amine of formula (II).

Preferred amines of formula (II) include, but are not limited to:

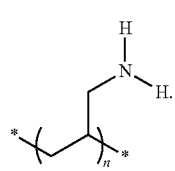

wherein n and m are independently from 10-2000, preferably from 100-1000, and more preferably from 200-600.

In a preferred embodiment, the polyamine is polyethyleneimine. Preferably, the polyethyleneimine has a number average molecular weight of from about 1,500 to about 100,000, more preferably from about 5,000 to about 50,000, and more preferably from about 10,000 to about 35,000. The polyethyleneimine may be linear or branched polyethyleneimine. In one embodiment, the polyethyleneimine is branched polyethyleneimine.

In another embodiment, the polyamine is a polymer characterized by comprising a repeating unit of formula (III):

(III)

wherein each n, independently, is from 10-2000, preferably from 100-1000, and more preferably from 200-600; and each R is independently selected from the group consisting of H and alkyl. In some embodiments, the polyamine may be a partially quaternized amine of formula (III).

A preferred amine of formula (III) includes, but is not limited to:

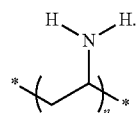

In another embodiment, the polyamine is a polymer characterized by comprising a repeating unit of formula (IV):

(IV)

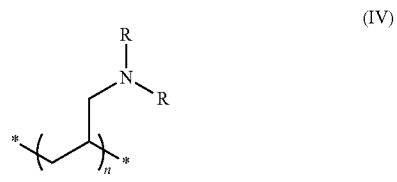

wherein each n, independently, is from 10-2000, preferably from 100-1000, and more preferably from 200-600; and each R is independently selected from the group consisting of H and alkyl. In some embodiments, the polyamine may be a partially quaternized amine of formula (IV).

Preferred amines of formula (IV) include, but are not limited to:

2. Anion Resins

As discussed herein, the dual function beads of the present disclosure may be a cross-linked polyamine that is the reaction product of a polyamine and an amine-reacting crosslinking agent, such as the beads described herein. Alternately, the dual function beads may be the reaction product of an amine-reacting moiety, and in particular, an alkylation agent (e.g., methyl chloride), and an anion resin.

In some embodiments, the anion resin may be a reaction product of a polyamine and an amine-reacting crosslinking agent, such as described herein. In other embodiments, the anion resin may be a polyamine epoxy anion resin, a styrene-divinyl benzene anion resin, an acrylic anion resin, or a phenol-formaldehyde anion resin. In embodiments where the anion resin is a polyamine epoxy anion resin, a styrene-divinyl benzene anion resin, an acrylic anion resin, or a phenol-formaldehyde anion resin, the anion resin will preferably be a commercially available polyamine epoxy anion resin, styrene-divinyl benzene anion resin, acrylic anion resin, or phenol-formaldehyde anion resin. Typically, the anion resin used to prepare the dual function beads will be the reaction product of a weak base resin and an amine-reacting moiety.

Polyamine epoxy anion resins, styrene-divinyl benzene anion resins, acrylic anion resins, and phenol-formaldehyde anion resins and their preparation are well known in the art, and are commercially available. For instance, suitable polyamine epoxy anion resins include, but are not limited to, Resintech® SIR-700 and Purolite® S106 resins. Suitable styrene-divinyl benzene anion resins include, but are not limited to, Dowex® 66 and Amberlite® FPA 51 resins. Suitable phenol-formaldehyde anion resins include, but are not limited to, Duolite® A7 and Duolite® A568 resins. Suitable acrylic anion resins include, but are not limited to, Amberlite® FPA53 and Purolite® A845 resins.

3. Crosslinking Agents

Suitable amine-reacting crosslinking agents include compounds such as small molecules, oligomers, or polymers having at least two functional groups (i.e., di- or multi-functional groups), such as a halogen group, epoxy group, ester group, a Michael acceptor, and combinations thereof. The crosslinking agent may be attached to a nitrogen on the polyamine backbone or to a pendant nitrogen atom of the polyamine. Examples of crosslinking agents that are suitable for synthesis of the polymers of the present invention include, but are not limited to, the crosslinking agents shown in Table 1.

TABLE 1

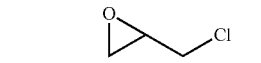

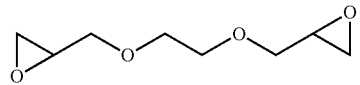 [SMILES: C(COCC1CO1)OCC1CO1]

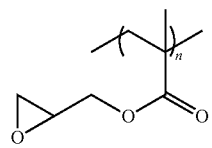

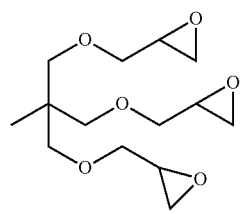

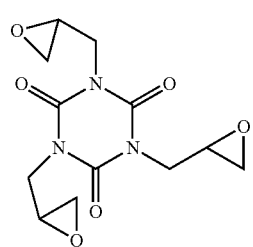 [SMILES: O=c1n(CC2CO2)c(=O)n(CC2CO2)c(=O)n1CC1CO1]

TABLE 1-continued

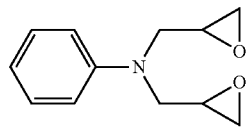 [SMILES: c1ccc(N(CC2CO2)CC2CO2)cc1]

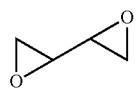

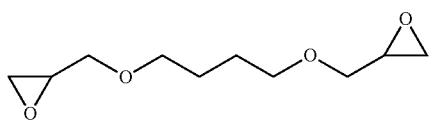 [SMILES: C(CCOCC1CO1)COCC1CO1]

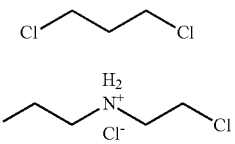

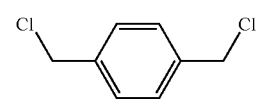

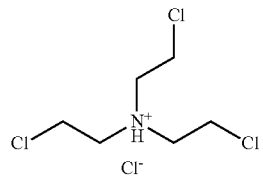

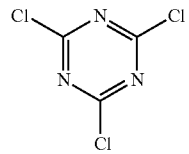

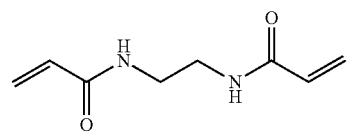

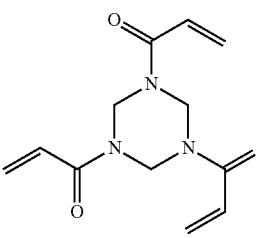

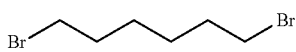

Examples of preferred crosslinking agents include epichlorohydrin, 1,4-butanedioldiglycidyl ether, 1,2-ethanedioldiglycidyl ether, 1,3-dichloropropane, 1,3-dibromopropane, α,α'-dichloro-p-xylene, ethylene bisacrylamide, and bis(2-chloroethyl)amine hydrochloride.

In various embodiments, the crosslinking agent is preferably epichlorohydrin.

4. Amine-Reacting Moieties

In some embodiments, the polymeric beads of the invention may be functionalized with an amine-reacting moiety. Functionalizing the polymeric beads with an amine reacting moiety may have several benefits, including: (i) increasing the strong base binding capacity (SBC) of the beads; (ii) altering the physical property of the bead, e.g., to improve selectivity of ion binding; or (iii) both increasing the strong base capacity and improving selectivity of ion binding.

For instance, in some embodiments, the polymeric beads may be functionalized with an amine-reacting moiety in order to increase the hydrophobicity of the bead for preferential binding of hydrophobic ions, such as perchlorate, iodide, iodate, bromide, bromate, and pertechnetate, while also quaternizing nitrogen atoms in the bead to increase the SBC of the bead.

In some embodiments, the polymeric beads may be functionalized with an amine-reacting moiety in order to introduce an ion-chelating group onto the bead to allow for a highly selective binding for specific ions (e.g., boron, transition metals, etc.), while also quaternizing nitrogen atoms in the bead to increase the SBC of the bead.

In some embodiments, the polymeric beads of the disclosure may be functionalized with an amine-reacting moiety in order to introduce a reducing group, such as an alcohol, onto the bead for reducing a specific oxidative anion (e.g., chromate, perchlorate, bromate, nitrate, etc.), while also quaternizing nitrogen atoms in the bead to increase the SBC of the bead.

The functionalized cross-linked polyamines of the present disclosure are preferably prepared by reacting a cross-linked polyamine of the present invention with an amine-reacting moiety to form a functionalized cross-linked polyamine (i.e., a cross-linked polyamine comprising an increased number of permanent quaternary nitrogen atoms). This reaction may proceed according to conditions known in the art. In other embodiments, the functionalized cross-linked polyamines of the disclosure may be prepared by: (i) reacting a polyamine with an amine-reacting moiety to form a functionalized polyamine, and subsequently crosslinking the functionalized polyamine; or, (ii) reacting a polyamine with a crosslinking agent in the presence of an amine-reacting moiety to form a functionalized crosslinked polyamine.

Polyamines suitable for use in preparing a functionalized cross-linked polyamine of the present disclosure are set forth above.

Useful amine-reacting moieties include, but are not limited to, polyhydroxyl compounds and amine-reacting alkyl or aryl compounds comprising thio, hydroxy, carboxyl, amido, amidoxime, quanidino, and/or imidino moieties. Preferably, the amine-reacting moiety is selected from those set forth below in Table II.

TABLE II

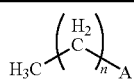

n = 0-9

TABLE II-continued

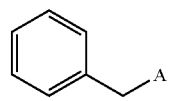

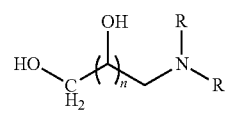

n = 1-4

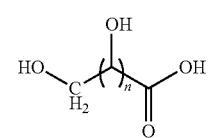

n = 1-4

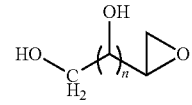

n = 0-4

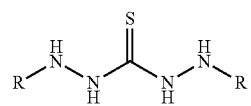

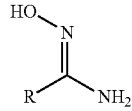

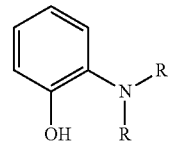

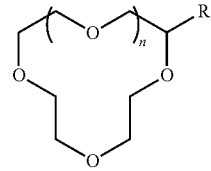

n = 1-3

A = epoxides; halides; amine; sulfur; isocyanate; carboxylic halids, anhydride, methyl ester R = Alkyl epoxides; halides; amine; sulfur; isocyanate; or carboxylic halids, anhydride, methyl ester Preferably, the amine-reacting moiety is selected from the group consisting of methyl chloride, ethyl bromide, propyl bromide, hexyl bromide, octyl bromide, 1,2-epoxybutane, 1,2-epoxyhexane, 1,2-epoxyoctane, benzyl chloride, and glycidol.

Other suitable amine-reacting moieties include those set forth in Table III:

TABLE III

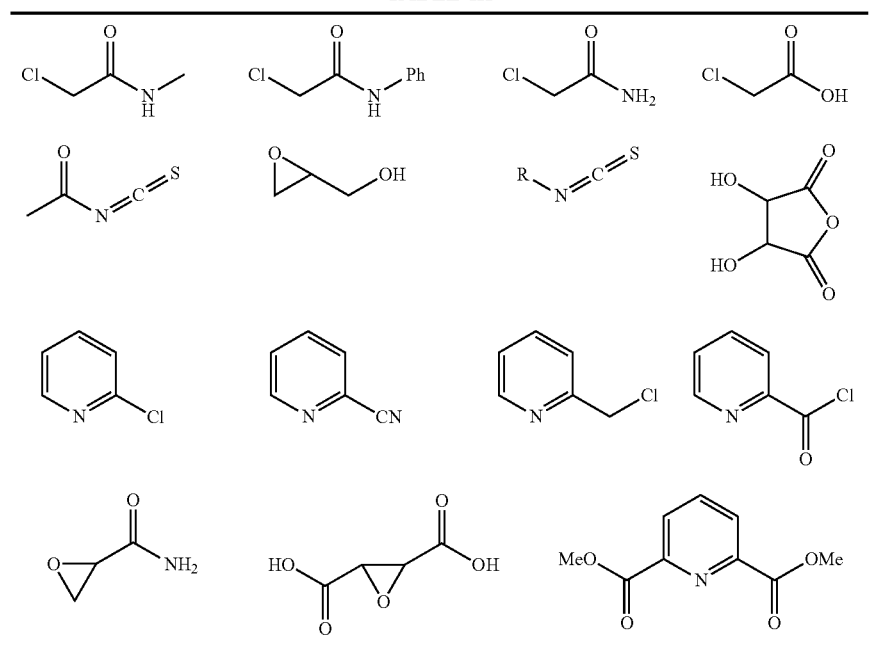

wherein R is selected from the group consisting of alkyl epoxides; halides; amine; sulfur; isocyanate; carboxylic halides; anhydride; and methyl ester.

II. PREPARATION OF BEADS

In some embodiments, the polymeric beads of the disclosure are the reaction product of an amine, such as a polyamine, and an amine-reacting crosslinking agent. The beads may be prepared using suspension or similar process techniques, which are generally known in the art. Preferably, the polymeric beads are obtained by inverse suspension polymerization. More specifically, the polyamine and amine-reacting crosslinking agent react to form a polymeric crosslinked network inside a suspended droplet, which is stabilized by a surfactant in a non-miscible solvent. Reaction processes can be carried out as batch, semi-continuous, and continuous processes. Reaction may occur in a one-pot process, or via sequential steps.

As discussed herein, the polymeric beads of the present disclosure may optionally be functionalized with an amine-reacting moiety. Functionalizing with an amine-reacting moiety may increase the number of permanently quaternized nitrogens present in the bead (i.e., form a bead having a higher degree of permanent quaternary amine), thus increasing the strong base capacity of the bead, and/or alter the physical properties of the bead (e.g., introduce functional groups to allow for selective binding to a specific anion). The beads may be functionalized by reacting the polyamine with an amine-reacting moiety before, during, or after reaction of the polyamine with the amine-reacting crosslinking agent and formation of the bead. For example, suitable methods for functionalizing the beads of the present disclosure include: (i) reacting a polyamine and an amine-reacting crosslinking agent to form a cross-linked polyamine, and then optionally reacting the crosslinked polyamine with an amine-reacting moiety to form a functionalized crosslinked polyamine; (ii) pretreating a polyamine with an amine-reacting moiety to form a functionalized polyamine, and then reacting the functionalized polyamine with an amine-reacting crosslinking agent to form a functionalized cross-linked polyamine; or (iii) reacting a polyamine and an amine-reacting crosslinking agent in the presence of an amine-reacting moiety to form a functionalized cross-linked polyamine.

As discussed herein, the polymeric beads are preferably prepared using inverse suspension polymerization processes. Such processes are well known in the art. Applicants have, however, now discovered that certain reaction conditions may be manipulated in order to produce polymeric beads with the desired properties. For instance, the crush strength, bead morphology, and binding capacity may be affected by one or more of the following process properties: (i) concentration of polyamine in the discrete phase; (ii) degree of protonation of the polyamine in the discrete phase; (iii) ratio of crosslinking agent to polyamine (i.e., crosslinking density); (iv) order and rate of introduction of the protonated polyamine solution into the continuous phase; and (v) initial reaction temperature and rate of addition of crosslinking agent.

Concentration of Polyamine in the Discrete Phase:

The concentration of polyamine in the discrete phase can impact the swelling of the final crosslinked polymeric bead. In particular, too dilute a polyamine solution may produce a sloppy (i.e., wet) gel, while too concentrated a polyamine solution increases the viscosity, causing the suspension process to fail. The polyamine concentration in the discrete phase of the methods of the present disclosure is preferably from about 10 wt/wt % to about 200 wt/wt %, or about 20 wt/wt to about 100 wt/wt %, and more preferably is from about 30 wt/wt % to about 70 wt/wt %. Preferably, the polyamine concentration in the discrete phase is about 40 wt/wt %.

Degree of Protonation of Polyamine in the Discrete Phase:

The degree of protonation refers to the mole percentage of nitrogen in the polyamine that is protonated. Use of protonated polyamine in the method increases the hydrophilicity and water-solubility and enhances the stability of the suspended discrete particles by increasing surface tension against deformation or abruption resulting from chemical, physical, and mechanical challenges that may occur during synthesis of the beads. However, excessive protonation of the polyamine retards its reaction with the crosslinking agent, which may result in a lower crosslinking density. Preferably, the degree of protonation in the polyamine used in the methods of the present disclosure is from about 5% to about 30%, or from about 5% to about 20%, and more preferably is from about 5% to about 15%. Preferably, the degree of protonation in the polyamine is about 10%.

Crosslinking Density:

As defined herein, crosslinking density refers to the percentage of mole of crosslinking agent per mole of nitrogen in the polyamine. Crosslinking density is generally dependent on the ratio of crosslinking agent to polyamine in the discrete phase (and subsequently the polymeric bead), and represents the theoretical number of linking points between polyamine present in the bead. The higher the crosslinking density, the stronger (i.e., higher crush strength) the bead. However, too high a crosslinking density impedes ion movement, thus decreasing kinetics or even rendering binding sites on the bead inaccessible to ions. In addition, too high a crosslinking density resulting from an excess of crosslinking agent might decrease the binding capacity due to additional weight from the extra crosslinking agent. The crosslinking density of the beads of the present disclosure is preferably from about 30% to about 70%, or from about 35% to about 60%, and more preferably is from about 40% to about 50%. Preferably, the crosslinking density is about 45%.

Order and Rate of Introduction of the Protonated Polyamine Solution into the Continuous Phase:

Applicants have discovered that gradual introduction of the protonated polyamine solution into the hydrophobic continuous phase reduces the number of inclusions present in the polymeric beads, and thus results in a better quality and stronger bead. More particularly, introduction of the protonated polyamine into the discrete phase at concentrations needed to produce the beads of the present disclosure results in a viscous solution (viscosity of about 1000-5000 cP). Previously known solution polymerization methods involve loading the polyamine solution together with the hydrophobic continuous phase into the reaction vessel at the initiation of synthesis (see, e.g., US 2014/0158630; US 2012/0118986; U.S. Pat. Nos. 7,459,502; and 3,803,237). This, however, may cause substantial inclusion of hydrophobic solvent in the polyamine droplets, which weakens the strength of the resulting beads, and decreases binding capacity. This is particularly problematic during production of larger sized beads (e.g., greater than 250 micron). For instance, 50%-75% of the beads produced using the methods disclosed in US 2014/0158630 or US 2013/0118986 were found to contain inclusions. U.S. Pat. No. 7,459,502 focuses on producing beads having a small particle size (e.g., 10-100 microns) for pharmaceutical applications, and does not teach or address the mechanical property (i.e., crush strength) of bigger particle size beads. Additionally, although the beads produced in U.S. Pat. No. 3,803,237 did not contain inclusions, these beads were produced using a small polyamine (molecular weight of 179) in low concentration, and had a crush strength of less than 80 g/bead.

Thus, for the methods of the present disclosure, the protonated polyamine solution is gradually added to the continuous phase (comprising a hydrophobic solvent and a surfactant) over a period of from about 5 to about 60 minutes, or more preferably over a period of from about 10 to about 45 minutes. Preferably, the protonated polyamine solution is added to the continuous phase over a period of about 30 minutes. Preferably, the protonated polyamine solution is added to the continuous phase under continuous mechanical agitation.

Initial Reaction Temperature and Rate of Addition of Crosslinking Agent:

Applicants have discovered that maintenance of a lower temperature during addition of the crosslinking agent and a slow rate of addition of the crosslinking agent advantageously produce a polymeric bead having a high crush strength. The reaction between the polyamine and crosslinking agent (e.g., an epoxide or halide) can take place at an appreciable rate above 0° C. For instance, at a temperature above 50-60° C., the reaction between the polyamine and crosslinking agent can be vigorous, and may release a large amount of heat (an exothermic reaction). In preparing the beads of the present disclosure, the crosslinking agent needs to travel through the hydrophobic phase and enter the polyamine droplet to initiate the reaction with the polyamine. At a high temperature, the crosslinking reaction happens upon contact between the crosslinking agent and the polyamine, resulting in dense crosslinking at the outer layer of the polyamine droplet. This dense crosslinking impedes the crosslinking agent from entering inside the droplet, resulting in heterogeneous crosslinking and a weaker bead (i.e., lower crush strength). This is particularly problematic during production of larger sized beads (e.g., greater than 250 micron). Additionally, a fast rate of addition of crosslinking agent causes the temperature to rise locally around the droplet due to the exothermic nature of the reaction. This also leads to a heterogeneous crosslinking and weaker bead.

Applicants have discovered that these drawbacks can be avoided, and a bead with a higher crush strength can be produced, by controlling the rate of addition of crosslinking agent and temperature of the reaction during addition of the crosslinking agent. In particular, the temperature of the reaction solution during addition of crosslinking agent is preferably maintained at from about 15° C. to about 45° C., and more preferably from about 20° C. to about 35° C. Preferably, the temperature is maintained at about 25° C. The crosslinking agent is preferably added to the reaction solution over a period of from about 0.5 hours to about 10 hours, or from about 1 hour to about 5 hours, or more preferably from about 1.5 hours to about 3 hours. Preferably, the crosslinking agent is added over a period of about 2 hours.

Thus, one useful method for producing the polymeric beads of the invention involves carrying out the polymerization/crosslinking reaction in a dispersed media (e.g., inverse suspension). In this embodiment, an amine solution comprising the polyamine is gradually introduced into a continuous phase under continuous agitation (e.g., mechanical agitation) to form a reaction solution. Preferably, the amine solution is introduced into the continuous phase at a rate that prevents solvent inclusions. Crosslinking agent is subsequently gradually introduced into the reaction solution comprising the amine solution and continuous phase under continuous agitation, such that the polyamine and crosslinking agent form a droplet discrete phase. Following addition of the crosslinking agent, the reaction is allowed to proceed at from about 30° C. to about 100° C. for from about 3 to about 24 hours until completion.

As discussed herein, the amine solution comprises a polyamine. The polyamine may be a small molecule amine, an amine oligomer, an amine polymer, or combinations thereof, but preferably comprises an amine polymer. Preferably, the polyamine is a protonated polyamine having a degree of protonation of from about 5% to about 30%, or from about 5% to about 20%, more preferably from about 5% to about 15%, and preferably about 10%. The amine solution will preferably have a weight ratio of polyamine to water of from about 10:1 to about 1:10, and more preferably of from about 3:1 to about 1:5, or from about 1.5:1 to about 1:2. Preferably, the polyamine solution comprises about 5% polyamine.

The continuous phase preferably comprises a hydrophobic solvent and a surfactant. The hydrophobic solvent may be, for example, a non-polar solvent such as a hydrocarbon alkane, toluene, or a halogenated benzene solvent. Preferably, the solvent is toluene or chlorinated benzene. Suitable surfactant can be selected from alkyl or aryl sulfonate, alkyl or aryl sulfate, alkyl or aryl carboxylate.

The temperature of the continuous phase is preferably maintained at between about 5° C. and 40° C., and preferably at a temperature of from about 15° C. to about 45° C., and more preferably from about 20° C. to about 35° C. during introduction of the amine solution. Preferably, the temperature is maintained at about 25° C. during introduction of the amine solution. As discussed herein, the amine solution is gradually introduced into the continuous phase. More particularly, the amine solution is introduced into the continuous phase over a period of from about 5 minutes to about 60 minutes, preferably from about 10 minutes to about 45 minutes, and more preferably over a period of about 30 minutes. Preferably, the amine solution is introduced into the continuous phase under continuous mechanical agitation. The amine solution is introduced into the continuous phase in an amount sufficient to achieve a concentration of polyamine in the discrete phase of from about 10 wt/wt % to about 200 wt/wt %, more preferably from about 20 wt/wt % to about 100 wt/wt %, more preferably form about 30 wt/wt % to about 70 wt/wt %, and preferably about 40 wt/wt %.

As discussed herein, the reaction solution comprising the amine solution and continuous phase is maintained at a temperature of from about 15° C. to about 45° C., more preferably from about 20° C. to about 35° C., and preferably at about 25° C. during introduction of the crosslinking agent. After introduction of the crosslinking agent, the temperature of the reaction solution is subsequently maintained at a temperature between about 30° C. and about 100° C., and more preferably at a temperature of from about 45° C. to about 70° C., and preferably 60° C. until the crosslinking reaction is complete.

As previously discussed, a low rate of addition of crosslinking agent is also needed in order to produce a polymer having a high crush strength. Preferably, the crosslinking agent is introduced into the reaction solution comprising the amine solution and continuous phase over a period of from about 0.5 to about 10 hours, or from about 1 to about 5 hours, and more preferably, over a period of from about 1.5 to about 3 hours, and preferably over a period of time of about 2 hours.

In one preferred embodiment, the present disclosure provides a method for preparing a polymeric bead having a crush strength of about 250 g/bead or more, the method comprising: (i) introducing an amine solution comprising a polyamine into a continuous phase comprising a hydrophobic solvent and a surfactant over a period of from about 5 minutes to about 60 minutes to form a reaction solution; (ii) introducing a crosslinking agent into the reaction solution at a temperature of from about 15° C. to about 45° C. over a period of from about 0.5 hours to about 10 hours; and, (iii) after addition of the crosslinking agent, maintaining the temperature of the reaction solution at from about 30° C. to about 100° C., until the crosslinking reaction is complete. In one preferred embodiment, the continuous phase has a temperature of from about 5° C. to about 40° C. during introduction of the amine solution, the amine solution comprises about 5% protonated polyamine, the amine solution is introduced into the continuous phase under mechanical agitation, and the temperature of the reaction solution is maintained at about 60° C. after addition of the crosslinking agent. Preferably, the polyamine is polyethyleneimine and the crosslinking agent is epichlorohydrin. The reaction product may be collected and washed using techniques known in the art, e.g. with methanol and water.

In another embodiment, the amine solution and the crosslinking agent can be premixed, and subsequently introduced into the continuous phase. In this embodiment, the reaction still proceeds at a low temperature. More specifically, in one embodiment, there is provided a method for preparing a polymeric bead having a crush strength of about 250 g/bead or more, the method comprising: (i) combining an amine solution with a crosslinking agent at a temperature of between about 0° C. and about 40° C. to form a reaction solution, wherein the amine solution comprises a polyamine; (ii) introducing the reaction solution into a continuous phase; and, (iii) maintaining the temperature of the reaction solution at between about 5° C. and about 100° C., until the reaction is completed. Preferably, the continuous phase comprises a hydrophobic solvent and a surface active agent.

In this embodiment, a process known or similar to a "jetting" process (such as described in U.S. Pat. No. 4,427,794, herein incorporated by reference for all relevant and consistent purposes), where the mixture is forced through a vibrating nozzle into a continuous phase, may be used to introduce the amine/crosslinking agent solution into the continuous phase. Mechanical stirring can be used as well, to form the particles.

In order to further improve the ion binding properties of the polymeric beads, in some embodiments, the method may further comprise reacting the polymeric bead with an amine-reacting moiety, such as those set forth in Tables II and III. In other embodiments, the polyamine may be reacted with an amine-reacting moiety prior to introducing the crosslinking agent into the reaction solution. In one particular embodiment, there is provided a method for producing a functionalized polymeric bead, comprising: (i) mixing a polymeric bead or polyamine with an amine-reacting moiety at a temperature of from about 5° C. to about 30° C. with or without aqueous or alcoholic solvents; and (ii) allowing the reaction to proceed at a temperature of from about 25° C. to about 85° C., or from about 45° C. to about 85° C., or more preferably from about 25° C. to about 80° C., for from about 2 to about 48 hours, or from about 6 to about 48 hours, or preferably from about 2 to about 24 hours, and preferably under continuous (e.g., mechanical) agitation. In embodiments where a polyamine is functionalized, the functionalized polyamine may subsequently be reacted with a crosslinking agent to form a functionalized crosslinked polyamine, using the methods described herein. The reaction product may be collected and washed using techniques known in the art (e.g., with methanol and water). Exemplary methods for producing a functionalized cross-linked polyamine are set forth in the examples.

In some embodiments, the present disclosure is directed to dual function beads, and methods for preparing dual function beads. The dual function beads may be a cross-linked polyamine that is the reaction product of a polyamine and an amine-reacting crosslinking agent. In these embodiments, the reaction product of a polyamine and an amine-reacting crosslinking agent may be prepared as described above.

In other embodiments, the dual function bead may be a cross-linked polyamine that is the reaction product of an amine-reacting moiety, such as an alkylating agent, and an anion resin. Suitable anion resins that may be used to prepare the dual function beads include the reaction product of a polyamine and an amine-reacting crosslinking agent, such as the cross-linked polyamines described herein, or may be selected from the group consisting of polyamine epoxide anion resins, styrene-divinyl benzene anion resins, acrylic anion resins, or phenol-formaldehyde anion resins. Amine-reacting moieties suitable for preparation of the dual function beads include those set forth herein. The dual function beads may be prepared according to the method set forth herein for preparation of functionalized beads. Exemplary methods for producing a dual function bead are set forth in the examples.

III. USE OF BEADS

The polymeric beads described herein may be used as an ion exchange resin in a variety of industrial or commercial-scale applications, such as groundwater remediation, radio waste management, municipal wastewater management, demineralization, toxin removal, mining, food refinery, research, agriculture, and the like.

In one particular embodiment, the present disclosure provides a method for removing ions from an aqueous solution, the method comprising contacting the aqueous solution with a plurality of polymeric beads of the present disclosure. The aqueous solution may be from any of a variety of industrial applications, such as those discussed below. The target ion may be selected from the group consisting of chloride, bromide, iodide, iodate, perchlorate, pertechnetate, sulfate, nitrate, phosphates, chromium ions, selenite, selenite, uranium, arsenic, gold, silver, molybdenum, nickel, and combinations thereof.

The polymeric beads may be used in batch or continuous processes. In one particular embodiment, the process is a continuous process. For example, the beads may be used in a continuous method of reducing a concentration of a target or pollutant ion from a polluted aqueous solution stream on an industrial scale. Such a method may comprise: (i) contacting the aqueous solution and a fixed bed comprising a plurality of ion binding beads of the present disclosure for a time period sufficient to reduce the concentration of the target ion in the aqueous solution and produce an aqueous solution product stream; and, (ii) collecting a product selected from the group consisting of the aqueous solution product stream and the target ion.

In some embodiments, the polymeric bead may be a composite material; for instance, the bead may be loaded with iron oxide during bead formation. Such composite beads may have a high density or may be used in conjunction with magnets for ballasted resin applications. Alternatively, such beads may be suitable for removal of arsenic, phosphate and/or selenium from an aqueous solution or a polluted aqueous solution stream.

In some embodiments, the polymer is a composite material loaded with zero valent metals, such as iron, copper, palladium or bimetallic zero valent composites with palladium, nickel, platinum. These materials can be used as reactive media to carry out reactions in groundwater treatment, including dehalogenation and denitrification.

In some embodiment, the polymeric beads are used in slurry/filtration devices. Such devices are commercially available and include, but are not limited to, MIEX®, CoMag® filtration system.

In some embodiments, the polymeric beads may be used in a pressure vessel, as slurry in a filtration device (i.e., a membrane device), in a sedimentation tank, or as part of a composite material where the polymer contacts the liquid in a sufficient time to remove or exchange the desired ions.

In some embodiments, the polymeric beads may be used in pressure vessels in lead-lag setup. For instance, as discussed above, the retain/react mechanism of action of beads comprising a mix of strong base anion and weak base anion allows the beads to continue treating water when the equilibrium concentration of a contaminant ion is below a regulated MCL, without the need to regenerate the beads. When the equilibrium concentration of the contaminant in an effluent is still above a regulated MCL, one or more additional treatment vessel comprising beads of the present disclosure can be attached in series to the initial treatment vessel to further reduce the concentration of the contaminant below a regulated MCL. Thus, depending on the influent concentration of the desired ion, a treatment system can be designed with one or more treatment vessels in a series to achieve effluent concentrations below a regulated MCL, without need for regeneration of the beads.

A partially quaternized bead of the present disclosure, such as a dual function bead disclosed herein, can thus be used as a disposable resin in the removal of oxidative anions, and in particular high-valent oxidative anions (e.g., chromates, chlorates, bromates, and/or nitrate), without the need to adjust the pH of the contaminated water when its pH is above 7. In some embodiments, the partially quaternized beads may be included in a treatment system, and optionally chained in a series of two or more treatment vessels in a lead-lag setup, to achieve a treatment goal without the need for bead regeneration.

Thus, in one embodiment, the present disclosure provides a treatment system comprising at least two water treatment vessels connected in series, wherein the treatment vessels comprise beads of the present disclosure.

In another embodiment, the present disclosure provides a method for removing an ion from an aqueous solution (e.g., contaminated water), the method comprising contacting the aqueous solution with a plurality of the dual function beads of the present disclosure. As discussed herein, these beads are capable of binding and concentrating a high-valent oxidative ion (e.g., chromates, chlorates, bromates, and/or nitrate), and reducing the high-valent oxidative ion to a low-valent ion (e.g., chromium (III)), even when the pH of the aqueous solution is above 7. The cross-linked polyamine is preferably selected from the group consisting of: i) the reaction product of a polyamine and an amine-reacting crosslinking agent; ii) the reaction product of an amine-reacting moiety (e.g., an alkylating agent) and a polyamine epoxy anion resin; iii) the reaction product of an amine-reacting moiety (e.g., an alkylating agent) and a styrene-divinyl benzene anion resin; iv) the reaction product of an amine-reacting moiety (e.g., an alkylating agent) and an acrylic anion resin; v) the reaction product of an amine-reacting moiety (e.g., an alkylating agent) and a phenol-formaldehyde anion resin, or vi) the reaction product of an amine-reacting moiety (e.g., an alkylating agent) and a cross-linked polyamine of the present disclosure. In one embodiment, the cross-linked polyamine is a tetraethylene pentamine-epichlorohydrin resin. The cross-linked polyamine may be in the form of substantially spherical beads or irregular granular particles.

The polymeric beads of the present disclosure may be disposable (i.e., one time use beads). Alternately, in some embodiments, the exhausted polymeric beads can be regenerated by a salt, a base, an acid, or anions using techniques known to those skilled in the art.

The polymeric beads of the present disclosure or their composites may be used in removing anions from a medium, such as an aqueous solution where the anions, include but are not limited to, chloride, chlorates, perchlorate, bromide, bromates, iodide, iodates, phosphates, nitrate, nitrite, sulfate, sulfite, carbonates, carboxylates, fatty acids, bile acids, arsenates, chromates, transition metal salts, and combinations thereof.

In some embodiments, the polymeric beads may be used in groundwater remediation for removing perchlorate, nitrate, chromium (e.g., chromium (VI)), arsenate, selenite, selenate, natural organic matter (NOM), uranium, and combinations thereof. Preferably, the ion is selected from the group consisting of chromium, perchlorate, nitrate, and combinations thereof, and preferably is chromium and/or perchlorate.

In some embodiments, the polymeric beads may be used in removal of radio waste such as, but not limited to, pertechnetate, iodine, iodate, uranium, and combinations thereof.

In some embodiments, the polymeric beads may be used in desalination applications such as, but not limited, bromide removal, boron removal, and concentrates management of heavy metal or toxic ion removal.

In some embodiments, the polymeric beads may be used in production of pure water, for example, by demineralization.

In some embodiments, the polymeric beads may be used in land and seawater mining such as for, but not limited to, mining of uranium, silver, gold, molybdenum, nickel, and combinations thereof.

In some embodiments, the polymeric beads may be used in waste water treatment such as, but not limited to, removal of nitrate, phosphate.

In some embodiments, the polymeric beads may be used in industrial water treatment such as, but not limited to, toxic metal removal and recovery.

In some embodiments, the polymeric beads may be used in food refinery such as, but not limited to, sugar refinery processes.

In some embodiments, the polymeric beads may be used in separation processes such as, but not limited to, media for chromatography, as a scavenger for sample preparation or purification for chemical reactions or biological reactions.

IV. DEFINITIONS

The term "alkyl" as used herein alone or as part of another group describes groups which are preferably lower alkyl containing from one to eight carbon atoms in the principal chain and up to 20 carbon atoms. They may be straight or branched chain or cyclic and include methyl, ethyl, propyl, isopropyl, butyl, hexyl and the like.

The term "alicyclic" refers to a ring that is not an aromatic ring. Alicyclic rings include both carbocyclic and heterocyclic rings.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The term "aryl" as used herein alone or as part of another group denote optionally substituted homocyclic aromatic groups, preferably monocyclic or bicyclic groups containing from 6 to 10 carbons in the ring portion, such as phenyl, biphenyl, naphthyl, substituted phenyl, substituted biphenyl, or substituted naphthyl.

The term "carbocyclic" refers to ring structures containing only carbon atoms in the ring. Carbon atoms of carbocyclic rings can be bonded to a wide range of other atoms and functional groups.

The terms "epoxy" or "epoxide" as used herein means a cyclic ether. The ring structure generally comprises about 2 carbon atoms in the ring.

The terms "halogen" or "halo" as used herein alone or as part of another group refer to chlorine, bromine, fluorine, and iodine.

The term "heterocyclo" or "heterocyclic" as used herein alone or as part of another group denote optionally substituted, fully saturated or unsaturated, monocyclic or bicyclic, aromatic or non-aromatic groups having at least one heteroatom in at least one ring, and preferably 5 or 6 atoms in each ring. The heterocyclo group preferably has 1 or 2 oxygen atoms and/or 1 to 4 nitrogen atoms in the ring, and is bonded to the remainder of the molecule through a carbon or heteroatom.

V. EXAMPLES

General Procedures

Synthesis of Polymeric Base Bead

In a 10 L container, 3.6 kg of polyethyleneimine was mixed with 4.65 L of deionized water and 720 mL of concentrated HCl, successively, while the temperature of the mixture was maintained such that it did not rise above 70° C. The resulted polyethyleneimine solution was then cooled to 27° C. for later use. To a 50 mL centrifuge tube were added 8.4 gm of Sulfonic 100 (Stepan Company), 14.5 mL of 2.0 M NaOH solution, and 25.5 mL of DI-water, followed by vigorously shaking to form the surfactant solution in water. To a jacketed 50 L reactor equipped with a mechanic stirrer and a digital temperature circulation control under an inert atmosphere, 24 L of chlorobenzene was added. The stirring speed was set to 130 rpm, and the reaction temperature was maintained at 27° C. The surfactant solution was then added to the reactor and stirred for 5 minutes. To the resulted solution the polyethyleneimine solution was gradually added over a course of 10-20 minutes, via a funnel and stirred for an additional 40-60 minutes. Then, a solution of 3 L of ECH in 7 L of chlorobenzene was added to the suspension at a rate of 50-100 mL/min, while the temperature of the mixture was held at 27° C. The resulted mixture was stirred for additional 30 min after completion of the addition. The reaction temperature was then increased to 68° C. over 1-2 hours, and was maintained for 5-10 hours. After the reaction mixture was cooled to ambient temperature, the reaction product was collected by a 100 micron mesh filter and washed with excessive amount of methanol following by DI water.

Functionalization of Polymeric Bead

In a 5 L container bottomed with a fritted disc and a stopcock, and equipped with an overhead mechanical stirrer, 2 liters of base beads and 4 liters of 1M sodium hydroxide were gently stirred for 1 hour. The liquid was then drained to dryness. To the resin 2 liters of anhydrous methanol was added and gently stirred for 30 minutes following by, draining to dryness again. To this resin, 2 liters of anhydrous methanol was added and the resulting mixture was again gently stirred for another 30 minutes, followed by draining to dryness. The resin was then transferred to 10 L reactor with addition of methanol (between ~3 liters). To the reaction mixture was added 4-10 mole of alkyl halide, and then the resulting mixture was maintained under inert atmosphere at temperature 45-85° C. over 6-48 hours. After the reaction mixture was cooled to ambient temperature, the reaction product was collected by a 100 micron mesh filter and washed with excessive amount of methanol, followed by DI water, to obtain the alkylated beads.

The alkylated beads can be further functionalized with a same or a different alkyl halide by repeating the procedure once.

Comparative Example 1: Synthesis of
Tetraethylenepentamine/Epichlorohydrin
Crosslinked Bead Using Procedure Disclosed in
U.S. Pat. No. 3,803,237

A tetraethylenepentamine/epichlorohydrin crosslinked bead was prepared using the procedure described in U.S. Pat. No. 3,803,237.

Into a 1 L two-neck flask equipped with a baffle and a mechanical stirrer was introduced 50 mg of Richonate 60B (a 60% aqueous slurry of sodium salts of alkylbenzenesulfonic acids) and 91 mL of deionized water, followed by 22.63 g of tetraethylenepentamine rinsed in with 5 mL of toluene. The solution was stirred at the low speed and then 490 mL of toluene was added to form a dispersion. To the stirred dispersion was added 27.3 g of epichlorohydrin, rinsed in with 5 mL of toluene, and the resulting mixture was heated at reflux for two hours. The reaction mixture was cooled to about 20° C. and then treated with 15 g of a 50% aqueous solution of sodium hydroxide. The mixture was removed from the reactor and filtered, and the copolymer was collected and washed with methanol, with DI water, and then was filtered to give about 40 g of tetraethylenepentamine-epichlorohydrin copolymer. Particle diameter: 50-500 micron; Gel strength: <80 g/bead; whole bead: >95%; Total capacity: 2.8 eq/L.

Comparative Example 2: Synthesis of
Polyethyleneimine/Epichlorohydrin Crosslinked
Bead Using Procedure Disclosed in U.S.
2013/0118986 and U.S. 2014/0158630

A polyethyleneimine/epichlorohydrin crosslinked bead was prepared using the procedure disclosed in U.S. Patent App. No. 2013/0118986 and U.S. Patent App. No. 2014/0158630.

A 1 L-Morton-type flask was equipped with an overhead mechanical stirrer, a thermometer, a reflux condenser, an additional funnel, and an inert gas port. To the flask was added 63 g of water-free PEI (Mw=25,000) While the flask was cooled in a water bath, a solution of 36 g of concentrated HCl in 42 g of DI-water was added with an occasional shaking. To this warm PEI solution was added a mixture of 1 g of sulfonic 100 (acid form of a branched surfactant) in 4 mL of 1.1 N sodium hydroxide solution. After shaking well, 450 mL of toluene was added and the mixture was stirred with temperature set at 80° C. in an oil bath maintained under a nitrogen atmosphere. After 30 min, a solution of 40 g of epichlorohydrin in 70 mL of toluene was added through an additional funnel within 45 min. The mixture was stirred for another 30 min after completion of epichlorohydrin addition and then the oil bathe temperature was adjusted to 110° C. and a dehydration process using a dean stark apparatus was initialed to collect about 30 mL of water. After cooling to room temperature, the beads were collected by filtration, then washed with 400 mL of methanol 3 times. The beads then were transferred to a container with 600 mL of 3 N NaOH solution and occasionally shaking for one hour. The beads were filtered and washed with DI water to afford polyethyleneimine/epichlorohydrin crosslinked bead. Particle diameter: 100-1000 micron; Gel strength: <80 g/bead; whole bead: <50%; Total capacity: 3.0 eq/L.

Examples 1-32

General Procedures for Synthesis of High Gel-Strength, High Capacity Polymeric Beads In a container, polyethyleneimine (Mw=25,000) was mixed with an equal weight of deionized water and concentrated HCl, successively, while the temperature of the mixture was maintained such that it did not rise above 70° C. The resulted polyethyleneimine solution was then cooled to about ambient temperature for later use. To a 50 mL centrifuge tube were added 8.4 gm of Sulfonic 100 (an alkylbenzene sulfonic acid, available from Stepan Company), 14.5 mL of 2.0 M NaOH solution, and 25.5 mL of DI-water, followed by vigorously shaking to form the surfactant stock solution in water. To a jacketed reactor equipped with a mechanic stirrer and a digital temperature circulation control under an inert atmosphere, chlorobenzene or toluene that is 6 to 7 times volume of water used to dissolve polyethyleneimine was added. The stirring speed was set to 130 rpm, and the reaction temperature was maintained at about ambient temperature. The surfactant solution that contains Sulfonic 100 equal to 0.25 wt % of polyethyleneimine was then added to the reactor and stirred for 5 to 15 minutes. To the resulted solution the polyethyleneimine solution was gradually added over a course of about 30 minutes, via a funnel and stirred for an additional 30-60 minutes. Then, a 30 volume % solution of epichlorohydrin (ECH) in chlorobenzene or toluene was added to the suspension over a period of 1 to 5 hours, while the temperature of the mixture was held at about ambient temperature. The resulted mixture was stirred for additional 30 min after completion of the addition. The reaction temperature was then increased to about 65° C. over 1-2 hours, and was maintained for 6-16 hours. Table IV show the stoichiometric and process condition where degree of protonation is the mole percentage of hydrogen chloride over equivalent of amine in polyethyleneimine; degree of crosslinking is the mole percentage of epichlorohydrin over equivalent of amine in polyethyleneimine; and initial suspension temperature is the temperature during addition of the surfactant solution during addition of the polyethyleneimine solution. After the reaction mixture was cooled to ambient temperature, the reaction product was collected by a 100 micron mesh filter and washed with excessive amount of methanol following by DI water. The particle size ranges from 100 μm to 1000 μm. Other properties are shown in Table V.

TABLE IV

| Ex. | Mass of PEI (g) | Mole of HCl | Mole of ECH | Degree of Protonation (%) | Degree of Cross-linking (%) | Initial suspension temp (° C.) | Total Cross-linker addition time (h) |
|---|---|---|---|---|---|---|---|
| 1* | 60 | 0.4114 | 0.638348 | 29.48367 | 45.74831 | 30 | 5 |
| 2 | 60 | 0.1452 | 0.638348 | 10.406 | 45.74831 | 30 | 10 |
| 3 | 60 | 0.2057 | 0.638348 | 14.74183 | 45.74831 | 40 | 5 |
| 4 | 60 | 0.1452 | 0.638348 | 10.406 | 45.74831 | 25 | 10 |

TABLE IV-continued

| Ex. | Mass of PEI (g) | Mole of HCl | Mole of ECH | Degree of Protonation (%) | Degree of Cross-linking (%) | Initial suspension temp (° C.) | Total Cross-linker addition time (h) |
|---|---|---|---|---|---|---|---|
| 5 | 60 | 0.1452 | 0.893688 | 10.406 | 64.04763 | 25 | 7 |
| 6 | 120 | 0.4114 | 1.787376 | 14.74183 | 64.04763 | 30 | 7 |
| 7 | 60 | 0.2057 | 0.638348 | 14.74183 | 45.74831 | 30 | 7 |
| 8 | 60 | 0.1452 | 0.574514 | 10.406 | 41.17348 | 30 | 5 |
| 9 | 60 | 0.1452 | 0.319174 | 10.406 | 22.87415 | 30 | 2 |
| 10 | 60 | 0.1452 | 0.574514 | 10.406 | 41.17348 | 30 | 2 |
| 11 | 360 | 0.8712 | 3.830091 | 10.406 | 45.74831 | 30 | 5 |
| 12 | 360 | 0.8712 | 3.830091 | 10.406 | 45.74831 | 30 | 5 |
| 13 | 360 | 0.8712 | 3.830091 | 10.406 | 45.74831 | 30 | 5 |
| 14 | 360 | 0.8712 | 3.830091 | 10.406 | 45.74831 | 25 | 1 |
| 15 | 360 | 0.8712 | 3.830091 | 10.406 | 45.74831 | 25 | 1 |
| 16 | 3600 | 8.712 | 38.30091 | 10.406 | 45.74831 | 27 | 2 |
| 17 | 3600 | 8.712 | 38.30091 | 10.406 | 45.74831 | 25 | 2 |
| 18 | 3600 | 8.712 | 38.30091 | 10.406 | 45.74831 | 27 | 2 |
| 19 | 3600 | 8.712 | 38.30091 | 10.406 | 45.74831 | 27 | 2 |
| 20 | 3600 | 8.712 | 38.30091 | 10.406 | 45.74831 | 27 | 2 |
| 21 | 17 | 0.02057 | 0.18078 | 5.203 | 45.72678 | 22 | 1.5 |
| 22 | 17 | 0 | 0.18078 | 0 | 45.72678 | 22 | 1.5 |
| 23 | 17 | 0 | 0.18078 | 0 | 45.72678 | 26 | 1 |
| 24 | 17 | 0.02057 | 0.181291 | 5.203 | 45.85595 | 26 | 1 |
| 25 | 34 | 0.04114 | 0.277043 | 5.203 | 35.03782 | 26 | 1 |
| 26 | 204 | 0.242 | 1.662259 | 5.10098 | 35.03782 | 26 | 2 |
| 27 | 204 | 0.242 | 1.662259 | 5.10098 | 35.03782 | 26 | 2 |
| 28 | 204 | 0.242 | 1.662259 | 5.10098 | 35.03782 | 26 | 2 |
| 29 | 3600 | 8.712 | 38.30091 | 10.406 | 45.74831 | 27 | 2 |
| 30 | 3600 | 8.712 | 38.30091 | 10.406 | 45.74831 | 27 | 2 |
| 31 | 3600 | 8.712 | 38.30091 | 10.406 | 45.74831 | 27 | 2 |
| 32 | 3600 | 8.712 | 38.30091 | 10.406 | 45.74831 | 27 | 2 |

*In Example 1, polyethyleneimine solution was fed into the reactor prior to the surfactant solution and organic solvent.

TABLE V

| Example | Whole bead (%) | Crush strength (gram/bead) | SBC (eq/L) | TC (eq/L) |
|---|---|---|---|---|
| 1 | 20 | <83 | | |
| 2 | | 169 | | |
| 3 | | 179 | | |
| 4 | | <83 | | |
| 5 | | 114 | | |
| 6 | | 293 | | |
| 7 | | 201 | 0.28 | |
| 8 | | 283 | 0.44 | |
| 9 | | 110 | | |
| 10 | | 116 | 0.75 | |
| 11 | | 187 | 0.33 | |
| 12 | | 330 | 0.34 | |
| 13 | | 282 | 0.47 | |
| 14 | | 288 | 0.29 | |
| 15 | | 214 | 0.33 | |
| 16 | 99 | 168 | 0.33 | 3.76 |
| 17 | | <83 | | 3.84 |
| 18 | 98 | 278 | 0.3 | 3.75 |
| 19 | 93 | 308 | 0.64 | 4.17 |
| 20 | 97 | 258 | | 3.96 |
| 21 | 10 | <83 | | |
| 22 | 80 | <83 | | |
| 23 | 18 | <83 | | |
| 24 | 93 | 183 | | |
| 25 | 98 | 185 | | |
| 26 | 95 | 183 | | |
| 27 | 94 | 203 | | |
| 28 | 85 | 230 | | |
| 29 | 91 | 308 | | 3.63 |
| 30 | 96 | 358 | | |
| 31 | 97 | 308 | | 3.54 |
| 32 | 97 | 293 | | 3.75 |

A microscopic image of a plurality of beads of Example 18 (comprising 10% strong base sites and 90% weak base sites) is set forth in FIG. 1.

Examples 33-148

General Procedure for Further Functionalization of High-Gel Strength, High-Capacity Polymeric Beads In a container bottomed with a fritted disc and a stopcock, and equipped with an overhead mechanical stirrer, high-gel strength, high-capacity polymeric bead, synthesized as described in Examples 1-32, and 2 volumes of 1M sodium hydroxide were gently stirred for 1 hour. The liquid was then drained to dryness. To the beads (resin) one volume of anhydrous methanol was added and gently stirred for 30 minutes following by, draining to dryness again. To this resin, another volume of anhydrous methanol was added and the resulting mixture was again gently stirred for another 30 minutes, followed by draining to dryness. The resin was then transferred to a reactor with addition of an alcohol (0 to 1.5 resin volume). To the reaction mixture was added amine-reacting moiety, and then the resulting mixture was maintained under inert atmosphere at temperature 45-85° C. over 6-48 hours. After the reaction mixture was cooled to ambient temperature, the reaction product was collected by a 100 micron mesh filter and washed with excessive amount of methanol, followed by DI water, to obtain the functionalized beads.

The functionalized beads can be further functionalized with a same or a different amine-reacting moiety by repeating the procedure once or more, for example, to increase the SBC of the bead. Some examples of functionalized beads are shown in Table VI.

TABLE VI

| Example | Starting Bead (Ex.) | Starting Bead Amount | Amine React. Moiety | Rxn. Temp (° C.) | Rxn. Time (h) | Solv. | SBC (eq/L) | Whole bead | Crush Strength (g/bead) |
|---|---|---|---|---|---|---|---|---|---|
| 33 | 16 | 100 g | MeCl (8 PSI) | 65 | 84 | MeOH (100 mL) | 2.28 | 93% | 420 |
| 34 | 17 | 1.5 L | MeCl (10 PSI) | 55 | 50 | MeOH (400 mL) | 1.91 | 94% | 310 |
| 35 | 18 | 1.5 L | MeCl (15 PSI) | 65 | 36 | MeOH (1 L) | 1.93 | 98% | 297 |
| 36 | 19 | 1.5 L | MeCl (15 PSI) | 65 | 36 | MeOH (1 L) | 1.71 | 98% | 315 |
| 37 | 19 | 1.44 L | MeCl (15 PSI) | 65 | 36 | MeOH (1 L) | 1.92 | 96% | 308 |
| 38 | 20 | 1.5 L | MeCl (15 PSI) | 65 | 36 | MeOH (1 L) | 1.96 | 96% | 312 |
| 39 | 17 | 1.7 L | MeCl (15 PSI) | 65 | 36 | MeOH (1 L) | 1.92 | 99% | 432 |
| 40 | 20 | 2 L | MeCl (15 PSI) | 65 | 36 | MeOH (1 L) | 2.02 | 96% | 342 |
| 41 | 20 | 2.6 g | EtBr (9 mL) | 25 | 80 | MeOH (9 mL) | 1.07 | | |
| 42 | 20 | 2.6 g | EtBr (9 mL) | 25 | 80 | EtOH (9 mL) | 0.73 | | |
| 43 | 20 | 2.6 g | EtBr (9 mL) | 25 | 80 | IPA (9 mL) | 0.60 | | |
| 44 | 20 | 2.6 g | EtBr (9 mL) | 65 | 24 | MeOH (9 mL) | 1.33 | | |
| 45 | 20 | 2.6 g | EtBr (9 mL) | 65 | 24 | EtOH (9 mL) | 0.73 | | |
| 46 | 20 | 2.6 g | EtBr (9 mL) | 65 | 24 | IPA (9 mL) | 0.60 | | |
| 47 | 20 | 2.6 g | EtBr (9 mL) | 45 | 24 | MeOH (9 mL) | 1.20 | | |
| 48 | 20 | 2.6 g | EtBr (9 mL) | 45 | 24 | EtOH (9 mL) | 0.60 | | |
| 49 | 20 | 2.6 g | EtBr (9 mL) | 45 | 24 | IPA (9 mL) | 0.53 | | |
| 50 | 44 | 2.6 g | EtBr (9 mL) | 65 | 24 | MeOH (9 mL) | 1.40 | | |
| 51 | 20 | 2.6 g | PropBr (11 mL) | 65 | 24 | MeOH (11 mL) | 1.07 | | |
| 52 | 20 | 2.6 g | HexBr (13 mL) | 65 | 24 | MeOH (13 mL) | 0.87 | | |
| 53 | 20 | 2.6 g | BnCl (14 mL) | 65 | 24 | MeOH (14 mL) | 1.60 | | |
| 54 | 20 | 2.6 g | BnCl (14 mL) | 65 | 24 | EtOH (14 mL) | 0.6 | | |
| 55 | 20 | 2.6 g | BnCl (14 mL) | 65 | 24 | IPA (14 mL) | 0.78 | | |
| 56 | 20 | 5.2 g | BnCl (5.6 mL) | 65 | 24 | EtOH (17 mL) | 0.9 | | |
| 57 | 20 | 5.2 g | BnCl (5.6 mL) | 65 | 24 | EtOH (50 mL) | 0.8 | | |
| 58 | 20 | 5.2 g | BnCl (5.6 mL) | 65 | 24 | (EtOH (17 mL), (2.5 mL DI) | 0.5 | | |
| 59 | 20 | 5.2 g | BnCl (5.6 mL) | 65 | 24 | EtOH (17 mL), (2.5 mL DI) | 0.48 | | |
| 60 | 20 | 5.2 g | BnCl (5.6 mL) | 65 | 24 | EtOH (17 mL) | 0.45 | | |
| 61 | 20 | 5.2 g | BnCl (14 mL) | 65 | 24 | MeOH (14 mL) | 0.61 | | |
| 62 | 20 | 5.2 g | BnCl (5.6 mL) | 65 | 24 | MeOH (17 mL) | 0.68 | | |
| 63 | 20 | 5.2 g | BnCl (5.6 mL) | 65 | 24 | IPA (17 mL) | 0.48 | | |
| 64 | 20 | 5.2 g | BnCl (5.6 mL) | 65 | 24 | ACN (17 mL) | 0.42 | | |
| 65 | 61 | 5.2 g | MeCl (4.7 g) | 65 | 24 | MeOH (20 mL) | 1.45 | | |
| 66 | 62 | 5.2 g | MeCl (4.7 g) | 65 | 24 | MeOH (20 mL) | 1.7 | | |
| 67 | 20 | 5.2 g | BnCl (5.6 mL) | 65 | 24 | DMF (17 mL) | 0.5 | | |
| 68 | 20 | 20.8 g | BnCl (5.6 mL) | 65 | 24 | EtOH (68 mL) | 0.48 | 96% | 385 |

TABLE VI-continued

| Example | Starting Bead (Ex.) | Starting Bead Amount | Amine React. Moiety | Rxn. Temp (° C.) | Rxn. Time (h) | Solv. | SBC (eq/L) | Whole bead | Crush Strength (g/bead) |
|---|---|---|---|---|---|---|---|---|---|
| 69 | 68 | 13.6 g | MeCl (4.7 g) | 65 | 24 | MeOH (20 mL) | 1.65 | 96% | 303 |
| 70 | 20 | 5.2 g | BnCl (5.6 mL) | 65 | 24 | EtOH (17 mL) | 0.49 | | |
| 71 | 20 | 5.2 g | BnCl (5.6 mL) | 65 | 24 | EtOH (17 mL) | 0.49 | | |
| 72 | 20 | 5.2 g | BnCl (5 mL) | 65 | 16 | No | 0.71 | | |
| 73 | 20 | 5.2 g | BnCl (2.6 mL) | 65 | 16 | MeOH (1.5 mL) | 0.54 | | |
| 74 | 20 | 5.2 g | BnCl (3 mL) | 65 | 16 | MeOH (4 mL) | 0.6 | | |
| 75 | 20 | 5.2 g | EtBr (5 mL) | 65 | 16 | No | 1.08 | 95% | |
| 76 | 20 | 5.2 g | PropBr (6 mL) | 65 | 16 | No | 0.6 | 95% | |
| 77 | 20 | 5.2 g | HexBr (5 mL) | 65 | 16 | No | 0.39 | 95% | |
| 78 | 20 | 5.2 g | BnCl (7 mL) | 65 | 16 | No | 0.95 | 95% | |
| 79 | 20 | 5.2 g | ECH (0.3 mL) | 25 to 45 | 19 | MeOH (6 mL) | 0.38 | 95% | |
| 80 | 20 | 5.2 g | ECH (0.6 mL) | 25 to 45 | 19 | MeOH (6 mL) | 0.48 | 95% | |
| 81 | 20 | 5.2 g | ECH (1.2 mL) | 25 to 45 | 19 | MeOH (6 mL) | 0.71 | 95% | |
| 82 | 20 | 11.9 g | BnCl (16 mL) | 65 | 12 | No | 0.95 | | |
| 83 | 20 | 5.2 g | PropCl (6 mL) | 65 | 12 | No | 0.27 | | |
| 84 | 20 | 11.9 g | PropCl (16 mL) | 65 | 24 | No | 0.3 | | |
| 85 | 84 | 11.9 g | PropCl (16 mL) | 65 | 24 | No | 0.3 | | |
| 86 | 82 | 13.1 mL | MeCl (4.7 g) | 65 | 24 | No | 1.6 | | |
| 87 | 20 | 5.2 g | BnCl (8 mL), MeCl(3.48 g) | 65 | 12 | No | 0.99 | 84% | 651 |
| 88 | 82 | 13.1 mL | BnCl (8 mL) | 65 | 12 | No | 0.67 | | |
| 89 | 20 | 13.1 mL | BnCl (8 mL), DI (.25 mL) | 65 | 12 | No | 0.89 | 90% | 744 |
| 90 | 20 | 13.1 mL | BnCl (8 mL), DI (.5 mL) | 65 | 12 | No | 0.89 | 83% | 753 |
| 91 | 20 | 13.1 mL | BnCl (8 mL), DI (1 mL) | 65 | 12 | No | 0.8 | | |
| 92 | 20 | 14.5 mL | BnCl (8 mL) | 65 | 96 | MeOH (5 mL) | 0.79 | 98% | 709 |
| 93 | 20 | 110 mL | BnCl (160 mL) | 65 | 12 | No | 1.03 | 87% | 645 |
| 94 | 93 | 105 mL | MeCl (15 PSI) | 65 | 12 | No | 1.6 | 95% | 609 |
| 95 | 20 | 13.1 mL | HexBr (10 mL) | 65 | 24 | No | 0.5 | | |
| 96 | 20 | 13.1 mL | HexBr (10 mL) | 65 | 48 | No | 0.51 | | |
| 97 | 20 | 13.1 mL | HexBr (10 mL) | 65 | 96 | No | 0.56 | | |
| 98 | 20 | 13.1 mL | BnCl (8 mL) | 65 | 3 | No | 0.68 | 94% | 715 |
| 99 | 20 | 13.1 mL | BnCl (8 mL) | 65 | 6 | No | 0.95 | 95% | 588 |
| 100 | 20 | 13.1 mL | BnCl (8 mL) | 65 | 12 | No | 1.05 | | |
| 101 | 20 | 13.1 mL | BnCl (8 mL) | 45 | 12 | No | 0.75 | 92% | 680 |
| 102 | 20 | 13.1 mL | BnCl (8 mL) | 55 | 12 | No | 0.81 | 95% | |
| 103 | 20 | 50 mL | BnCl (65 mL) | 55 | 12 | No | 0.75 | | |
| 104 | 20 | 50 mL | HexBr (65 mL) | 55 | 12 | No | 0.37 | 94% | 380 |

TABLE VI-continued

| Example | Starting Bead (Ex.) | Starting Bead Amount | Amine React. Moiety | Rxn. Temp (°C.) | Rxn. Time (h) | Solv. | SBC (eq/L) | Whole bead | Crush Strength (g/bead) |
|---|---|---|---|---|---|---|---|---|---|
| 105 | 20 | 50 mL | HexBr (65 mL) | 75 | 12 | No | 0.37 | 97% | 378 |
| 106 | 103 | 50 mL | MeCl (15 PSI) | 65 | 20 | No | 1.41 | 93% | 534 |
| 107 | 20 | 25 mL | BnCl (15 mL) | 75 | 6 | No | 0.9 | 85% | 746 |
| 108 | 18 | 40 mL | EtBr (25 mL) | 65 | 12 | No | 1.2 | 88% | 740 |
| 109 | 25 | 14 mL | BnCl (8 mL) | 65 | 10 | No | 0.74 | | 483 |
| 110 | 109 | 15 mL | MeCl (15 PSI) | 65 | 11 | No | 1.45 | 95% | 353 |
| 111 | 26 | 25 mL | BnCl (14 mL) | 65 | 12 | No | 0.96 | 90% | 383 |
| 112 | 26 | 25 mL | BnCl (14 mL) | 50 | 12 | No | 1.09 | 92% | 483 |
| 113 | 26 | 25 mL | BnCl (14 mL) | 65 | 24 | No | 0.96 | 95% | 353 |
| 114 | 26 | 25 mL | BnCl (14 mL) | 50 | 24 | No | 1.12 | 98% | 433 |
| 115 | 26 | 25 mL | BnCl (14 mL) | 40 | 12 | No | 0.87 | 95% | |
| 116 | 26 | 25 mL | BnCl (14 mL) | 40 | 24 | No | 1 | 96% | |
| 117 | 112 | 23 mL | MeCl (15 PSI) | 55 | 24 | MeOH (40 mL) | 1.67 | 90% | 333 |
| 118 | 114 | 23 mL | MeCl (15 PSI) | 55 | 24 | MeOH (40 mL) | 1.64 | 92% | 233 |
| 119 | 115 | 23 mL | MeCl (15 PSI) | 55 | 24 | MeOH (40 mL) | 1.56 | 90% | 233 |
| 120 | 116 | 23 mL | MeCl (15 PSI) | 55 | 24 | MeOH (40 mL) | 1.56 | 94% | 283 |
| 121 | Mix of 14, 18, 19 | 3.6 L (DI) | BnCl (2 kg) | 50 | 24 | No | 0.9 | 92% | 718 |
| 122 | 28 | 65 mL | BnCl (32 mL) | 55 | 12 | No | 1.05 | | |
| 123 | 121 | 3.2 L | MeCl (15 PSI) | 55 | 24 | MeOH (3 L) | 1.21 | | |
| 124 | 123 | 3.2 L | MeCl (15 PSI) | 55 | 24 | MeOH (3 L) | 1.48 | 91% | 717 |
| 125 | 29 | 5 L | BnCl (2.5 kg) | 50 | 12 | No | 0.77 | | |
| 126 | 125 | 2 L | MeCl (15 PSI) | 55 | 16 | MeOH (0.6 L) | 1.29 | | 661 |
| 127 | 30 | 4 L | BnCl (2 L) | 50 | 12 | No | 0.77 | 95% | 353 |
| 128 | 127 | 3 L | MeCl (15 PSI) | 55 | 12 | MeOH (3.6 L) | 1.39 | 96% | 730 |
| 129 | 30 | 0.1 L (DI) | EtBr (61 mL) | 55 | 18 | No | 1.03 | 98% | 363 |
| 130 | 127 | 250 mL | EtBr (156 mL) | 55 | 18 | No | 1.32 | 92% | 629 |
| 131 | 31 | 4.1 L (DI) | BnCl (4.5 L) | 55 | 24 | No | 0.81 | | |
| 132 | 31 | 0.1 L (DI) | MeCl (15 PSI) | 55 | 24 | MeOH (0.1 L) | 1.42 | 92% | 343 |
| 133 | 131 | 1 L | MeCl (15 PSI) | 55 | 12 | MeOH (1.2 L) | 1.45 | 89% | 746 |
| 134 | 131 | 1 L | MeCl (15 PSI) | 55 | 12 | MeOH (1.2 L) | 1.48 | 89% | 746 |
| 135 | 31 | 2.25 L | BnCl (2 L) | 55 | 24 | No | 0.87 | 91% | |
| 136 | 135 | 1 L | MeCl (15 PSI) | 55 | 12 | MeOH (1.2 L) | 1.32 | | |
| 137 | 136 | 1 L | MeCl (15 PSI) | 55 | 12 | MeOH (1.2 L) | 1.42 | 96% | 712 |
| 138 | 32 | 25 mL | MeCl (15 PSI) | 55 | 4 | MeOH (15 mL) | 0.95 | 99% | 280 |
| 139 | 32 | 25 mL | MeCl (15 PSI) | 55 | 18 | MeOH (15 mL) | 1.32 | 99% | 330 |
| 140 | 32 | 0.5 L (DI) | MeCl (15 PSI) | 55 | 18 | MeOH (500 mL) | 1.29 | 99% | |
| 141 | 32 | 200 mL (DI) | MeCl (15 PSI) | 55 | 12 | MeOH (150 mL) | 1.52 | | |

TABLE VI-continued

| Example | Starting Bead (Ex.) | Starting Bead Amount | Amine React. Moiety | Rxn. Temp (° C.) | Rxn. Time (h) | Solv. | SBC (eq/L) | Whole bead | Crush Strength (g/bead) |
|---|---|---|---|---|---|---|---|---|---|
| 142 | Mix of 30, 20 | 2.9 L | MeCl (15 PSI) | 55 | 18 | MeOH (1 L) | 1.38 | | |
| 143 | Mix of 18, 19 | 1.25 L (DI) | MeCl (15 PSI) | 55 | 12 | MeOH (1 L) | 1.6 | 98% | 563 |
| 144 | Mix of 18, 19 | 1.25 L (DI) | MeCl (15 PSI) | 55 | 12 | MeOH (1 L) | 1.53 | 98% | 633 |
| 145 | Mix of 18, 19 | 1.25 L (DI) | MeCl (15 PSI) | 55 | 12 | MeOH (1 L) | 1.45 | 98% | 615 |
| 146 | Mix of 18, 19 | 1.25 L (DI) | MeCl (15 PSI) | 55 | 12 | MeOH (1 L) | 1.5 | 98% | 615 |
| 147 | 29 | 30 mL | MeCl (15 PSI) | 55 | 12 | MeOH (45 mL) | 1.1 | | |
| 148 | 147 | 18 mL | MeCl (15 PSI) | 55 | 12 | MeOH (20 mL) | 1.95 | | |

MeCl = methyl chloride;
EtBr = ethyl bromide;
PropBr = propyl bromide;
HexBr = hexyl bromide;
BnCl = benzyl chloride;
ECH = epichlorohydrin;
PropCl = propyl chloride;
MeOH = methanol;
EtOH = ethanol;
IPA = isopropyl alcohol;
ACN = acetonitrile;
DMF = dimethylformamide.

Figure 2:
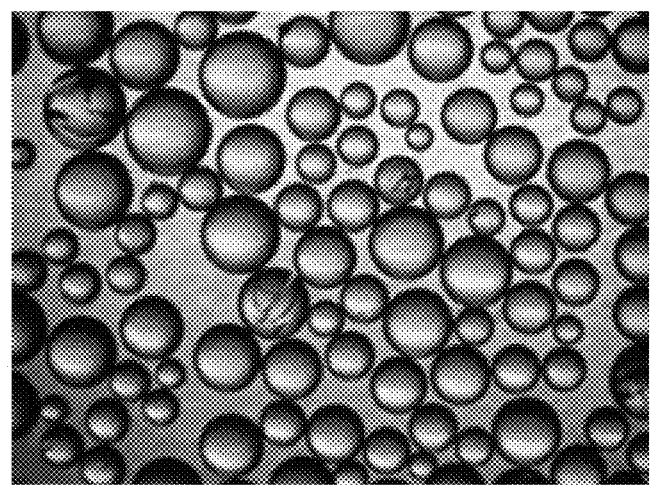
FIG. 2 is an image of polymeric beads of the present disclosure (about 600 micron, average size) comprising 80% strong base sites and 20% weak base sites, as described in Example 33.

A microscopic image of a plurality of the beads of Example 33 (comprising 80% strong base sites and 20% weak base sites) is set forth in FIG. 2.

Example 149: Methylation of Weak Base Resin

In this example, the commercially available granular weak base anion resin Resintech® SIR-700 (epoxy polyamine) was methylated to increase the strong base capacity of the resin.

In a container bottomed with a fritted disc and a stopcock, 155 mL of Resintech® SIR-700 and 310 mL of 1M sodium hydroxide were gently shaken for 1 hour. The liquid was then drained to dryness. To the resin, 155 mL of anhydrous methanol was added and the resulting mixture was gently shaken for 30 minutes following by, draining to dryness again. To this resin, another 155 mL of anhydrous methanol was added and the resulting mixture was again gently stirred for another 30 minutes, followed by draining to dryness. The resin was then transferred to a reactor with addition of 230 mL methanol. To the reaction mixture was purged and pressurized with methyl chloride to 15 psi and then the resulting mixture was maintained under inert atmosphere at a temperature of 55° C. for 12 hours. After the reaction mixture was cooled to ambient temperature, the reaction product was collected by a 100 micron mesh filter and washed with excessive amount of methanol, followed by DI water, to obtain the methylated SIR-700 (SBC 0.73 eq/L). The process was then repeated with the methylated SIR-700. The resulting resin (referred to herein as resin 149) had a SBC 1.23 eq/L.

Example 150: Perchlorate Operating Capacity in Synthetic Groundwater Spiked with 10 ppm of Perchlorate The perchlorate operating capacity of beads of the present disclosure was evaluated in a synthetic groundwater spiked with 10 ppm of perchlorate, which represents a contaminate site near Sacramento, Calif.

Polymeric beads were prepared according to the protocol described in Examples 94 and 108. These two resins and commercially available strong base anion resin Purolite® A532E (SBC of 0.85 eq/L) were loaded into three separated columns with DI water. Each column was then connected to a peristaltic pump that was then connected to the synthetic water via tubings. The synthetic water consisted of 9.6 ppm of chloride, 14 ppm of sulfate, 130 ppm of bicarbonate, 10 ppm of nitrate, and 10 ppm of perchlorate at pH 7.75. The column geometry and other engineering parameters are shown below in Table VII.

TABLE VII

| Target ion | Perchlorate |
|---|---|
| Target ion concentration (ppm) | 10 |
| Flow rate (mL/min) | 2.5 |
| Expected loading capacity (g/L) | 79.6 |
| Resin bed volume (mL) | 10 |
| Column diameter (cm) | 1.35 |
| Cross-sectional area (cm$^2$) | 1.43 |
| Bed depth (cm) | 6.99 |
| Aspect ratio (H:W) | 4.88 |
| Flow rate (BV/hr) | 15 |
| Flow velocity (gpm/ft$^2$) | 0.43 |
| Flow velocity (Lpm/m$^2$) | 17.47 |

Figure 3:
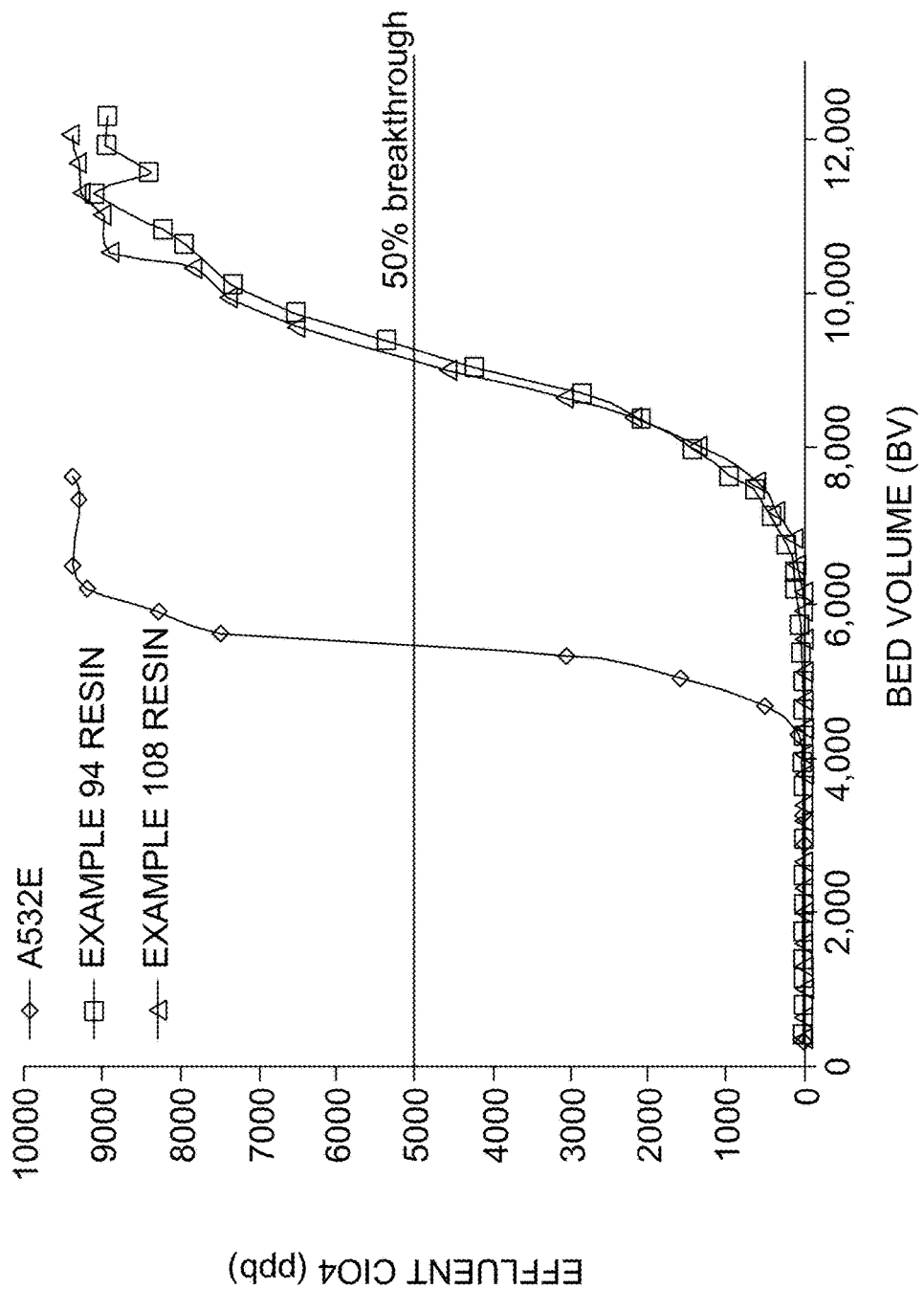
FIG. 3 is a graph illustrating the perchlorate operating capacity in synthetic groundwater spiked with 10 ppm perchlorate for beads of the present disclosure, as compared to commercially available strong base anion resin, as described in Example 150. The capacities were measured at 50% of influent concentration.

The effluents of these three columns were collected periodically and analyzed by ion chromatography made by Dionex®. The effluent perchlorate concentrations were plotted against the treated bed volume (BV) as shown in FIG. 3. The capacities at 50% of influent concentration were recorded as: Purolite® A532E, 5580 BV; Example 94 resin, 9290 BV; Example 108 resin, 9150 BV.

Example 151: Perchlorate Operating Capacity in a Synthetic Groundwater Spiked with 4.6 ppm of Perchlorate The perchlorate operating capacity of beads of the present disclosure was evaluated in a synthetic groundwater spiked with 4.6 ppm of perchlorate, which represents a contaminate site near Sacramento, Calif.

Polymeric beads were prepared according to protocol described in Examples 144 and 146. These two resins, as well as commercially available strong base anion resins Purolite® A532E (SBC of 0.85 eq/L) and Dowex® PSR-2 (SBC of about 0.65 eq/L) were loaded into four separated columns with DI water. Each column was then connected to a peristaltic pump that was then connected to the synthetic water via tubings. The synthetic water consisted of 9.6 ppm of chloride, 14 ppm of sulfate, 130 ppm of bicarbonate, 10 ppm of nitrate, and 4.6 ppm of perchlorate at pH 7.75. The column geometry and other engineering parameters are shown below in Table VIII.

TABLE VIII

| Target ion | Perchlorate |
|---|---|
| Target ion concentration (ppm) | 4.6 |
| Flow rate (mL/min) | 7 |
| Expected loading capacity (g/L) | 79.6 |
| Resin bed volume (mL) | 20 |
| Column diameter (cm) | 1.35 |
| Cross-sectional area (cm$^2$) | 1.43 |
| Bed depth (cm) | 13.97 |
| Aspect ratio (H:W) | 9.76 |
| Flow rate (BV/hr) | 21 |
| Flow velocity (gpm/ft$^2$) | 1.2 |
| Flow velocity (Lpm/m$^2$) | 48.90 |

Figure 4:
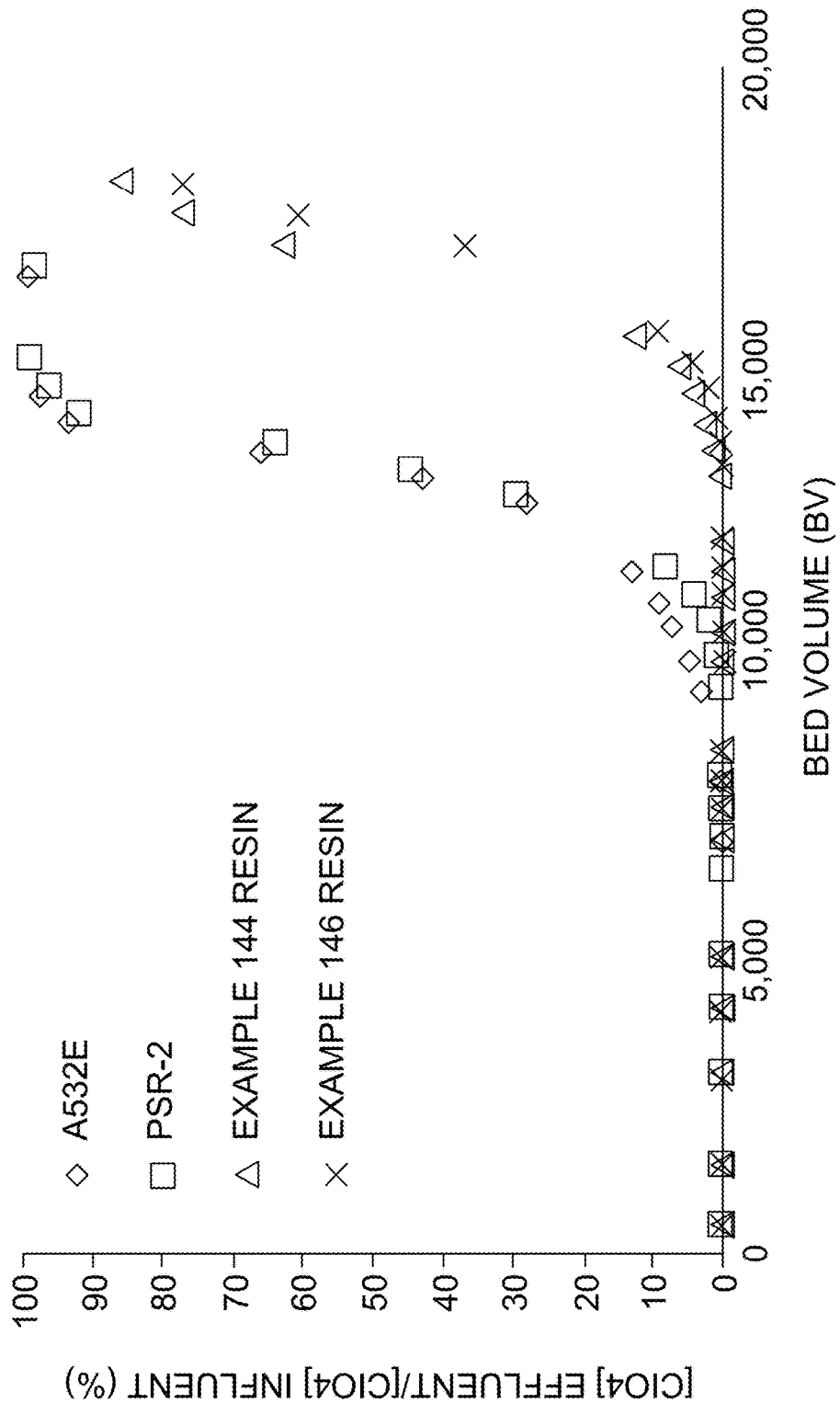
FIG. 4 is a graph illustrating the perchlorate operating capacity in synthetic groundwater spiked with 4.6 ppm perchlorate for beads of the present disclosure, as compared to commercially available strong base anion resins, as described in Example 151. The capacities were measured at 50% of influent concentration.

The effluents of these four columns were collected periodically and analyzed by ion chromatography made by Dionex®. The effluent perchlorate concentrations were plotted against the treated bed volume (BV) as shown in FIG. 4. The capacities at 50% of influent concentration were recorded as: Purolite® A532E, 13,200 BV; Dowex® PSR-2, 13,300 BV; Example 144 resin, 16,600 BV; Example 146 resin, 17,300 BV.

Example 152: Nitrate Operating Capacity in a Synthetic Groundwater Spiked with 132 ppm of Nitrate The nitrate operating capacity of beads of the present disclosure was evaluated in a synthetic groundwater spiked with 132 ppm of nitrate, which represents a contaminate site near Glendale, Ariz.

Polymeric beads were prepared according to the protocol described in Example 94. This resin and commercially available strong base anion resin Purolite® A520E (SBC of about 0.9 eq/L) were loaded into two separated columns with DI water. Each column was then connected to a peristaltic pump that was then connected to the synthetic water via tubings. The synthetic water consisted of 60 ppm of chloride, 40 ppm of sulfate, 120 ppm of bicarbonate, and 132 ppm of nitrate at pH 7.7. The column geometry and other engineering parameters are shown below in Table IX.

TABLE IX

| Target ion | Nitrate |
|---|---|
| Target ion concentration (ppm) | 132 |
| Flow rate (mL/min) | 2 |
| Expected loading capacity (g/L) | 99.2 |
| Resin bed volume (mL) | 10 |
| Column diameter (cm) | 1.35 |
| Cross-sectional area (cm$^2$) | 1.43 |
| Bed depth (cm) | 6.99 |
| Aspect ratio (H:W) | 4.88 |
| Flow rate (BV/hr) | 12 |
| Flow velocity (gpm/ft$^2$) | 0.34 |
| Flow velocity (Lpm/m$^2$) | 13.97 |

Figure 5:
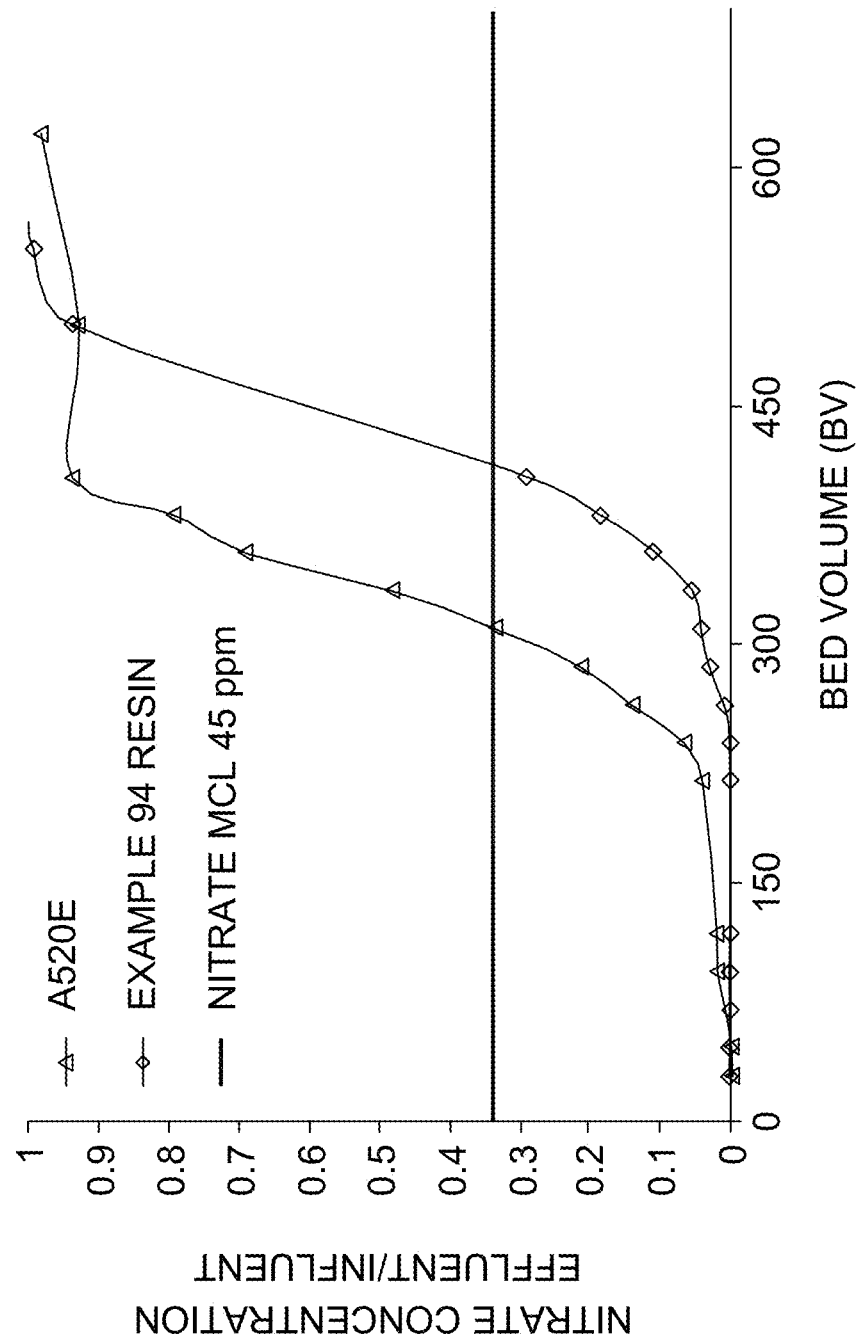
FIG. 5 is a graph illustrating the nitrate operating capacity in synthetic groundwater spiked with 132 ppm of nitrate for beads of the present disclosure, as compared to commercially available strong base anion resin, as described in Example 152. The capacities were measured at a MCL of 45 ppm.

The effluents of these two columns were collected periodically and analyzed by ion chromatography made by Dionex®. The effluent nitrate concentrations were plotted against the treated bed volume (BV) as shown in FIG. 5. The capacities at nitrate MCL 45 ppm were recorded as: Purolite® A520E, 305 BV; Example 94 resin, 410 BV.

Example 153: Chromium Operating Capacity in a Synthetic Groundwater Spiked with 58 ppm of Chromate The chromium operating capacity of beads of the present disclosure was evaluated in a synthetic groundwater spiked with 58 ppm of chromate, which represents a contaminate site near Scottsdale, Ariz.

Polymeric beads were prepared according to protocol described in Example 33. This resin and commercially available strong base anion resin Dowex® 11 (SBC of about 1.3 eq/L) were loaded into two separated columns with DI water. Each column was then connected to a peristaltic pump that was then connected to the synthetic water via tubings. The synthetic water consisted of 24 ppm of chloride, 8 ppm of sulfate, 244 ppm of bicarbonate, and 58 ppm of chromate at pH 7.6. The column geometry and other engineering parameters are shown below in Table X.

TABLE X

| Target ion | Chromate |
|---|---|
| Target ion concentration (ppm) | 58 |
| Flow rate (mL/min) | 2.5 |
| Expected loading capacity (g/L) | 116 |
| Resin bed volume (mL) | 10 |
| Column diameter (cm) | 1.35 |
| Cross-sectional area (cm$^2$) | 1.43 |
| Bed depth (cm) | 6.99 |
| Aspect ratio (H:W) | 4.88 |
| Flow rate (BV/hr) | 15 |
| Flow velocity (gpm/ft$^2$) | 0.43 |
| Flow velocity (Lpm/m$^2$) | 17.47 |

Figure 6:
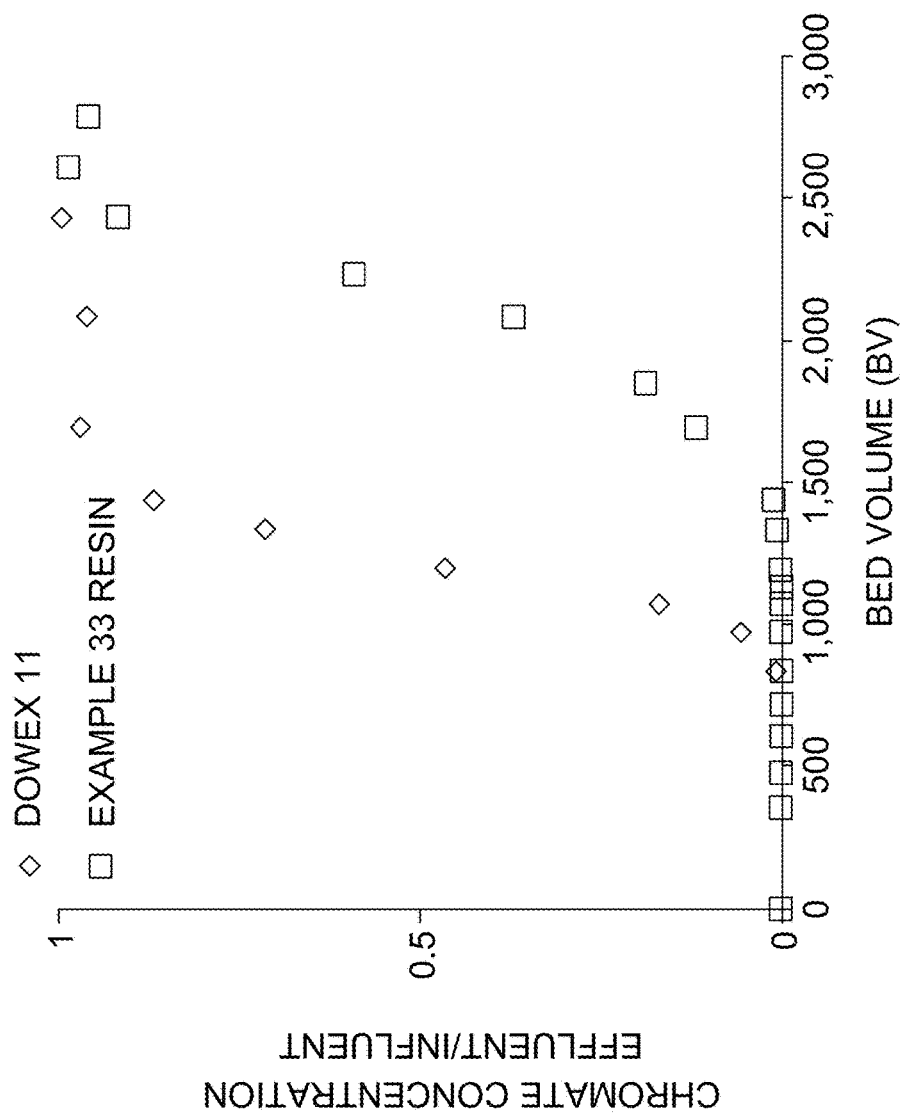
FIG. 6 is a graph illustrating the chromate operating capacity in synthetic groundwater spiked with 58 ppm of chromate for beads of the present disclosure, as compared to commercially available strong base anion resin, as described in Example 153. The capacities were measured at 50% of influent concentration.

The effluents of these two columns were collected periodically and analyzed by ultraviolet-visible spectroscopy (UV-Vis) at 370 nm wavelength. The effluent chromate concentrations were plotted against the treated bed volume (BV) as shown in FIG. 6. The capacities at 50% of influent concentration were recorded as: Dowex® 11, 1220 BV; Example 33 resin, 2180 BV.

Example 154: Chromium Operating Capacity in a Synthetic Groundwater Spiked with 16 ppb of Chromium The chromium operating capacity of beads of the present disclosure was evaluated in a synthetic groundwater spiked with 16 ppb of chromate, which represents a contaminate site near San Andreas, Calif.

Polymeric beads were prepared according to protocol described in Example 33. This resin and commercially available strong base anion resin Dowex® SAR (SBC of about 1.4 eq/L) were loaded into two separated columns with DI water. Each column was then connected to a peristaltic pump that was then connected to the synthetic water via tubings. The synthetic water consisted of 20 ppm of sulfate, 6.5 ppm of nitrate, and 16 ppb of chromium at pH 7.7. The column geometry and other engineering parameters are shown below in Table XI.

TABLE XI

| Target ion | Chromium |
|---|---|
| Target ion concentration (ppm) | 0.016 |
| Flow rate (mL/min) | 13.3 |
| Expected loading capacity (g/L) | 104 |
| Resin bed volume (mL) | 10 |
| Column diameter (cm) | 1.35 |
| Cross-sectional area (cm$^2$) | 1.43 |
| Bed depth (cm) | 6.99 |
| Aspect ratio (H:W) | 4.88 |
| Flow rate (BV/hr) | 79.8 |
| Flow velocity (gpm/ft$^2$) | 2.28 |
| Flow velocity (Lpm/m$^2$) | 92.92 |

Figure 7:
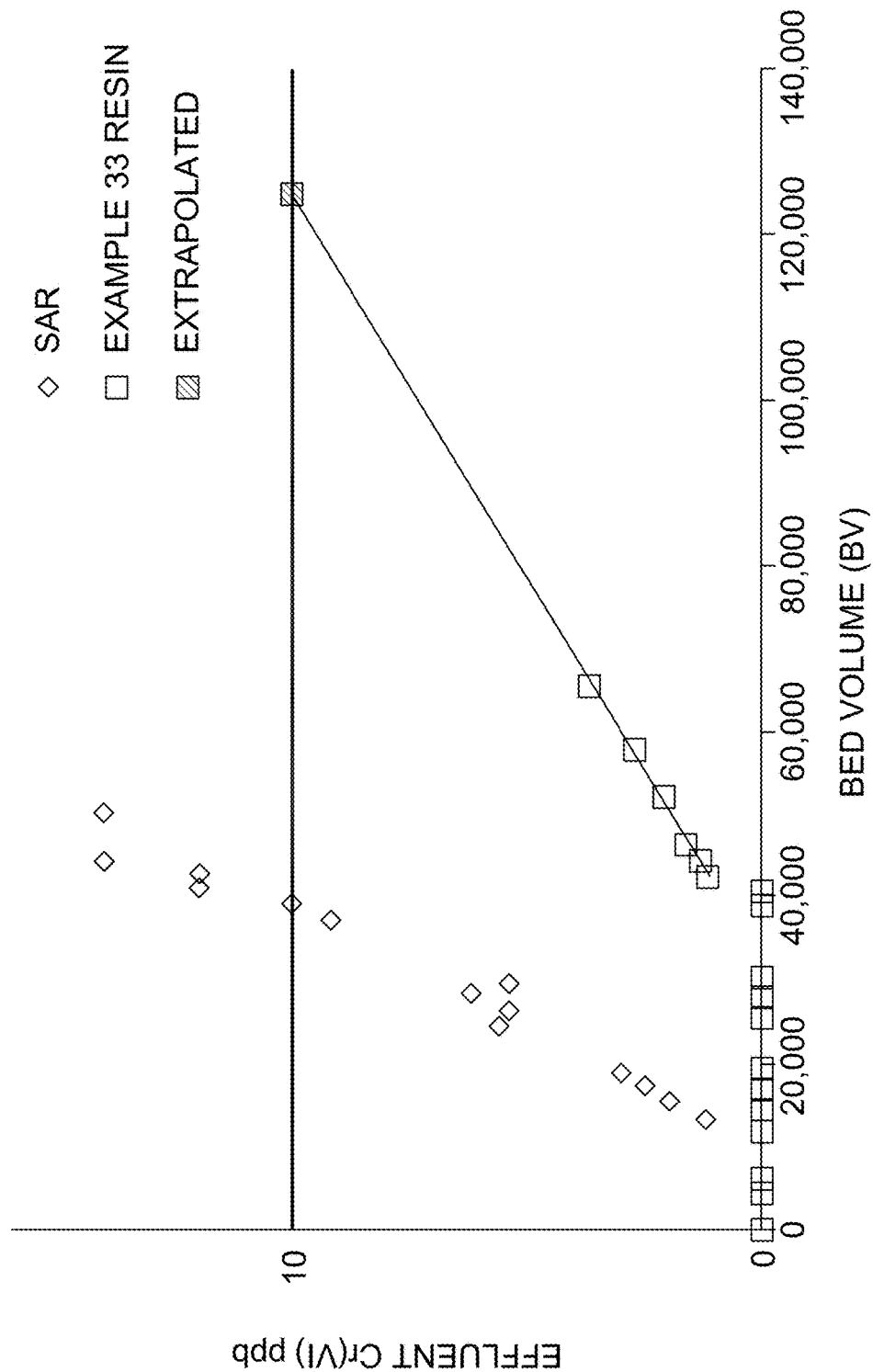
FIG. 7 is a graph illustrating the chromium operating capacity in synthetic groundwater spiked with 16 ppb of chromium for beads of the present disclosure, as compared to commercially available strong base anion resin, as described in Example 154. The capacities were measured at the California MCL of 10 ppb. The graph depicts an extrapolated capacity for the Example 33 resin at 10 ppb.

The effluents of these two columns were collected periodically and analyzed by an outside vendor Eurofins. The effluent chromium concentrations were plotted against the treated bed volume (BV) as shown in FIG. 7, where an extrapolated data point at 10 ppb for the Example 33 resin was also included. The capacities at California MCL @ 10 ppb were recorded as: Dowex® SAR, 39,000 BV; Example 33 resin, c.a. 125,000 BV.

Example 155: Chromium Operating Profile in a Synthetic Groundwater Spiked with 5 ppm of Chromate The chromium operating profile of beads of the present disclosure was evaluated in a synthetic groundwater spiked with 5 ppm of chromate, which represents a contaminate site near Glendale, Calif.

Polymeric beads were prepared according to protocol described in Example 149 (resin 149). This resin was loaded into a column with DI water. The column was then connected to a peristaltic pump that was then connected to the synthetic water via tubings. The synthetic water consisted of 8.7 ppm of nitrate, 93 ppm of sulfate, 34 ppm of silicate, 0.29 ppm of phosphate, and 5 ppm of chromate at pH 7.75. The column geometry and other engineering parameters are shown below in Table XII.

TABLE XII

| Target ion | Chromate |
|---|---|
| Target ion concentration (ppm) | 5 |
| Flow rate (mL/min) | 2.5 |
| Expected loading capacity (g/L) | 116 |
| Resin bed volume (mL) | 10 |
| Column diameter (cm) | 1.35 |
| Cross-sectional area (cm$^2$) | 1.43 |
| Bed depth (cm) | 6.99 |
| Aspect ratio (H:W) | 4.88 |
| Flow rate (BV/hr) | 15 |
| Flow velocity (gpm/ft$^2$) | 0.43 |
| Flow velocity (Lpm/m$^2$) | 17.47 |

Figure 8:
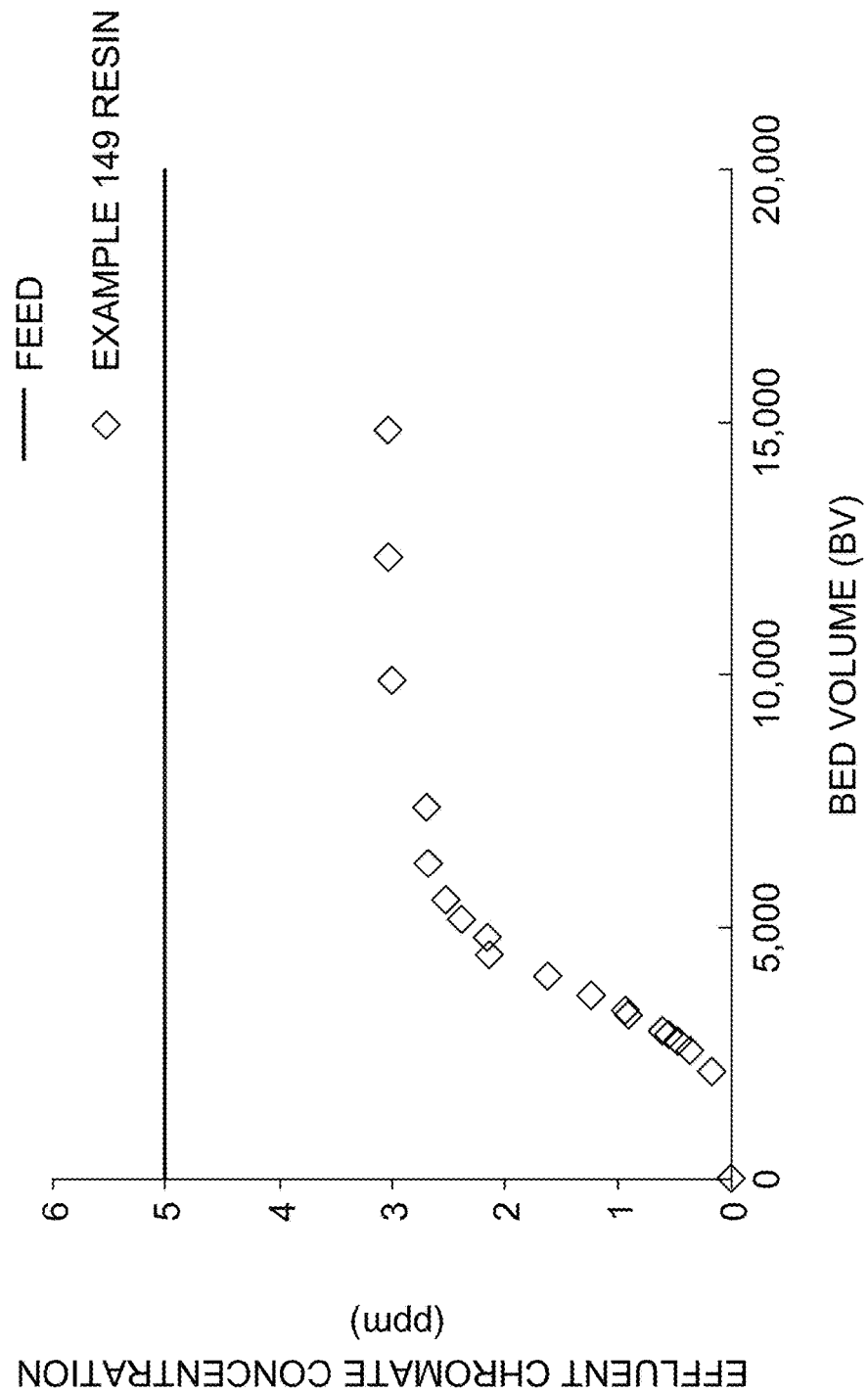
FIG. 8 is a graph illustrating the chromium operating profile in a synthetic groundwater spiked with 5 ppm of chromate for beads of the present disclosure, as described in Example 155. The effluent concentration reached an equilibrium concentration at about 60% of influent concentration.

The effluents was collected periodically and analyzed by UV-Vis at 370 nm wavelength. The effluent chromate concentrations were plotted against the treated bed volume (BV) as shown in FIG. 8. The effluent concentration reached an equilibrium concentration at about 60% of influent concentration.

Example 156: Chromium Operating Profile in a Synthetic Groundwater Spiked with 200 ppb of Chromate The chromium operating profile of beads of the present disclosure was evaluated in a synthetic groundwater spiked with 200 ppb of chromate, which represents a contaminate site near Glendale, Calif.

Polymeric beads were prepared according to protocol described in Example 33. This resin was loaded into a column with DI water. The column was then connected to a peristaltic pump that was then connected to the synthetic water via tubings. The synthetic water consists of 8.7 ppm of nitrate, 93 ppm of sulfate, 34 ppm of silicate, 0.29 ppm of phosphate, and 200 ppb of chromate at pH 7.75. The column geometry and other engineering parameters are shown below in Table XIII.

TABLE XIII

| Target ion | Chromate |
|---|---|
| Target ion concentration (ppm) | 5 |
| Flow rate (mL/min) | 2.5 |
| Expected loading capacity (g/L) | 116 |
| Resin bed volume (mL) | 10 |
| Column diameter (cm) | 1.35 |
| Cross-sectional area (cm$^2$) | 1.43 |
| Bed depth (cm) | 6.99 |
| Aspect ratio (H:W) | 4.88 |
| Flow rate (BV/hr) | 15 |
| Flow velocity (gpm/ft$^2$) | 0.43 |
| Flow velocity (Lpm/m$^2$) | 17.47 |

Figure 9:
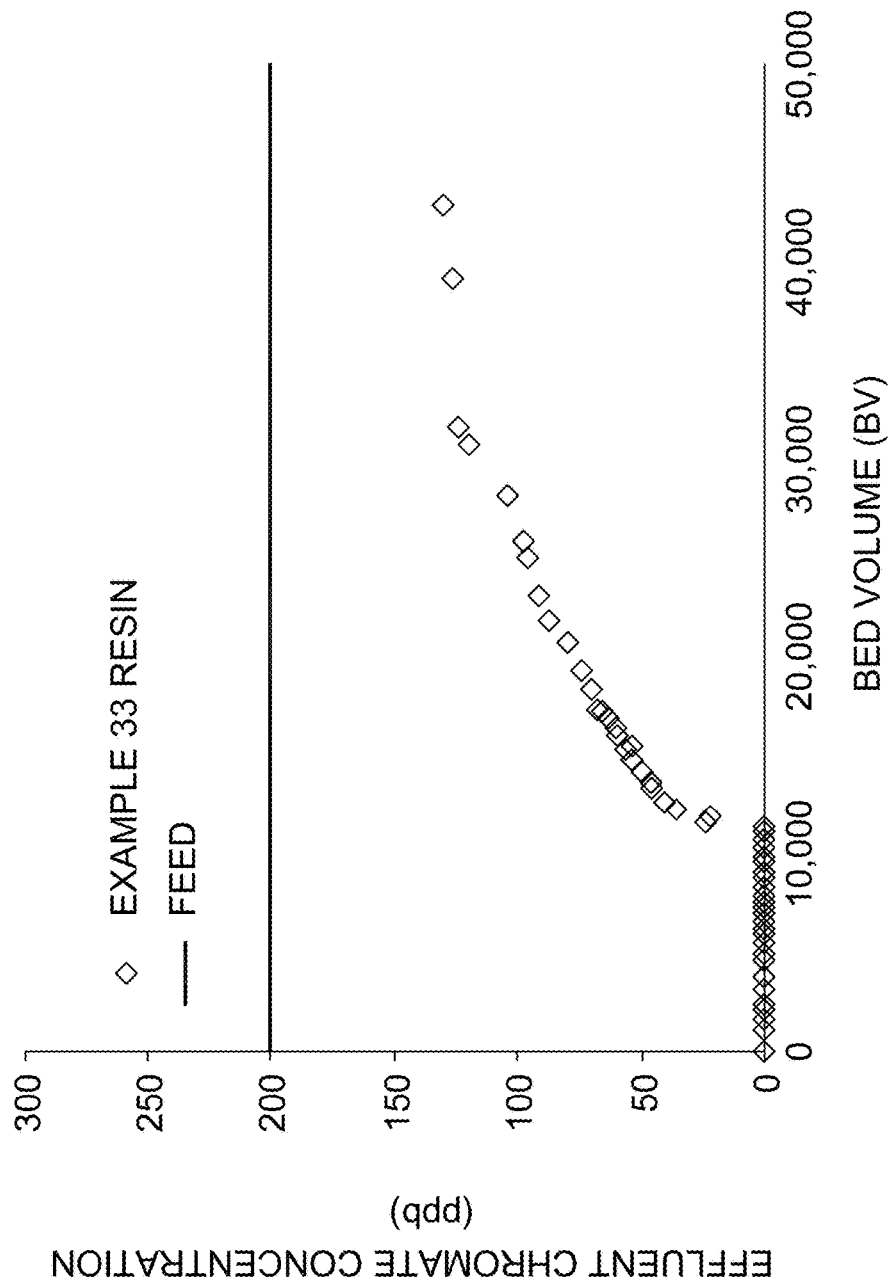
FIG. 9 is a graph illustrating the chromium operating profile in a synthetic groundwater spiked with 200 ppb of chromate for beads of the present disclosure, as described in Example 156. The effluent concentration reached an equilibrium concentration at about 65% of influent concentration.

The effluent was collected periodically and analyzed by UV-Vis at 370 nm wavelength. The effluent chromate concentrations were plotted against the treated bed volume (BV) as shown in FIG. 9. The effluent concentration reached an equilibrium concentration at about 65% of influent concentration.

Example 157: Chromium Operating Capacity in Groundwater from a Well at Glendale Calif. (on Site Test)

The chromium operating capacity of beads of the present disclosure was evaluated in a groundwater from a well at Glendale, Calif.

Figure 10:
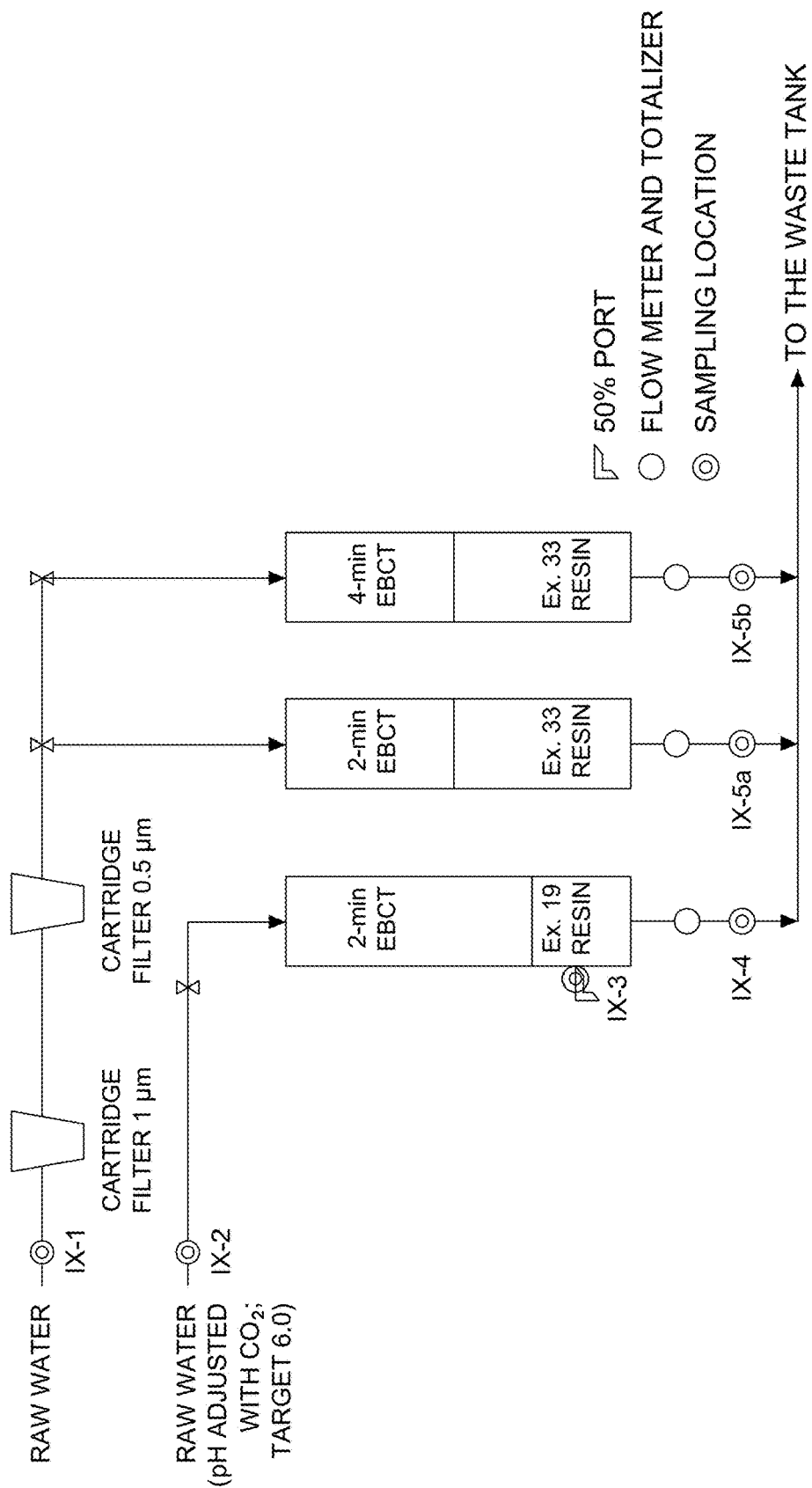
FIG. 10 is a schematic representation of an on-site set up used to evaluate the chromium operating capacity of beads of the present disclosure in groundwater from a well at Glendale, Calif., as described in Example 157.

Polymeric beads were prepared according to protocol described in Example 19 and Example 33. The schematic setup of the test is shown in FIG. 10, where two different flow rates (2 minutes EBCT (Empty Bed Contact Time) and 4 minutes EBCT) were applied to two separated Example 33 bead columns; and one flow rate at 2 minutes EBCT was applied to the Example 19 beads. The feed groundwater for the Example 19 bead column was pre-acidified to about pH 6.

The operational conditions are shown below in Table XIV.

TABLE XIV

| Design Parameter | Example 19 beads | Example 33 beads (2 min EBCT) | Example 33 beads (4 min EBCT) |
| --- | --- | --- | --- |
| Column Diameter (in) | 2.5 | 2.5 | 2.5 |
| Cross Sectional Area (sf) | 0.034 | 0.034 | 0.034 |
| Bed Depth (in) | 13 | 30 | 30 |
| Bed Volume (cf) | 0.04 | 0.09 | 0.09 |
| EBCT (min) | 2.0 | 2.0 | 4.0 |
| Flow Rate (gpm) | 0.14 | 0.32 | 0.16 |
| HLR (gpm/sf) | 4.0 | 9.5 | 4.75 |
| Service Flow Rate (gpm/cf) | 3.7 | 3.7 | 1.85 |
| Daily Water Required (gal) | 196 | 466 | 233 |
| BVs per Day per Column | 720 | 720 | 360 |
| Operating pH | 6.0 | Same as raw water pH | Same as raw water pH |
| Operational Mode | Down flow | Down flow | Down flow |
| Run Time | Up to 9 months | Until full breakthrough | Until full breakthrough |
| Backwash Frequency | Backwash when severe head loss is observed | | |

HLR = hydraulic loading rate.

The groundwater chemistry is shown below in Table XV.

TABLE XV

| Parameter (unit) | Average | Range |
| --- | --- | --- |
| Cr6 (ppb) | 18.5 | 16-21 |
| Total Cr (ppb) | 19.2 | 17-22 |
| Alkalinity (mg/L as $CaCO_3$) | 201 | 190-210 |
| Calcium (mg/L as Ca) | 98 | 89-100 |
| Chloride (mg/L) | 76 | 73-77 |
| Conductivity (μs/cm) | 947 | 940-950 |
| Nitrate (mg/L as N) | 7.7 | 7.3-7.9 |
| Phosphate (mg/L as $PO_4$) | 0.14 | 0.13-0.17 |
| Silicate (mg/L) | 39 | 36-42 |
| Sulfate (mg/L) | 117 | 110-120 |
| TOC (mg/L) | 0.45 | 0.38-0.52 |
| TSS (mg/L) | <10 | <10 |
| Uranium (pCi/L) | 2.8 | 2.0-3.1 |
| pH - feed for Example 33 beads | 7.0 | 6.5-7.6 |
| pH - feed for Example 19 beads column | 5.9 | 5.5-6.1 |
| Temperature - Field (° C.) | 21.9 | 20.1-25.1 |

TOC = total organic content;
TSS = total suspended solid

Figure 11:
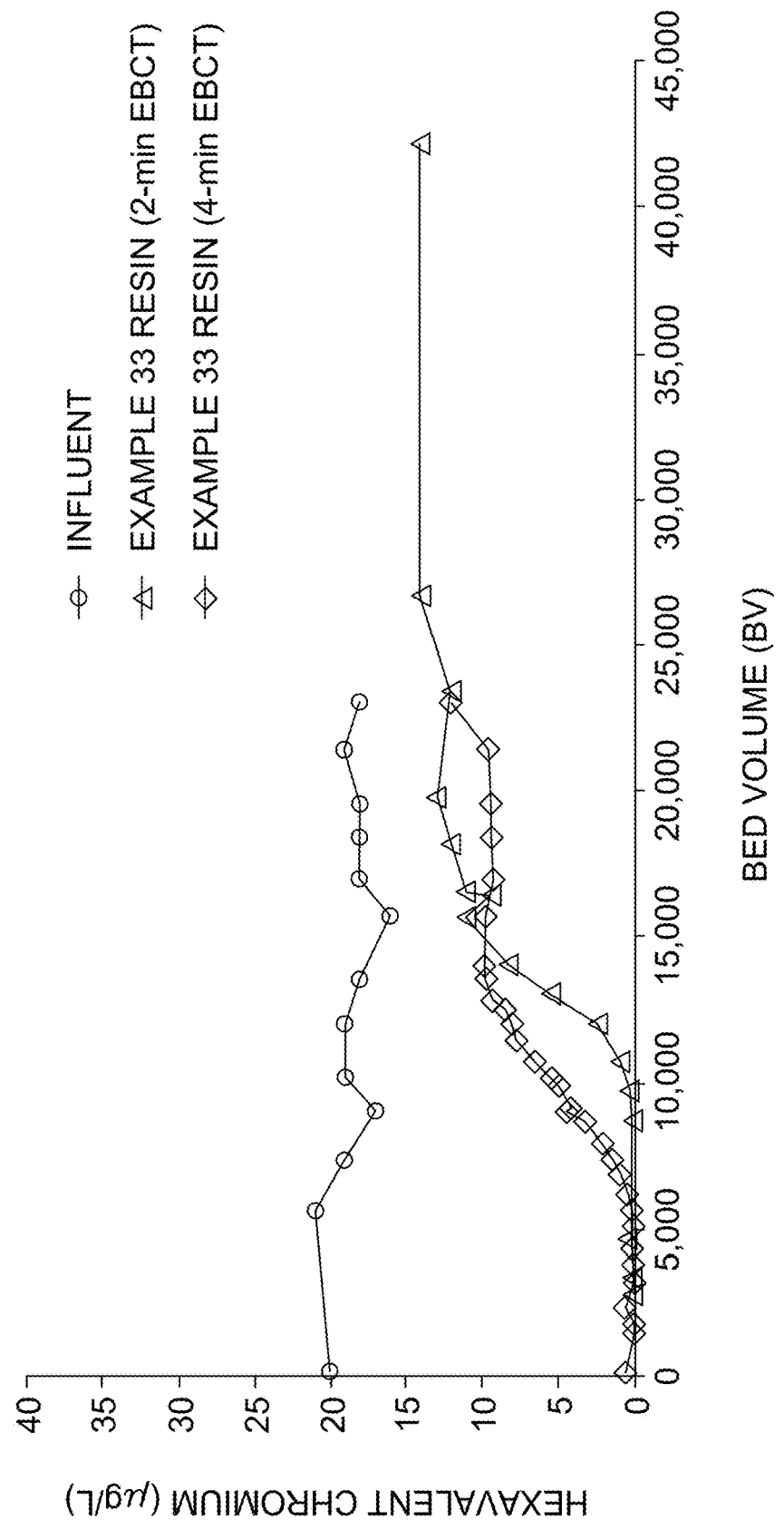
FIG. 11 is a graph illustrating the chromium operating capacity of beads of the present disclosure in groundwater from a well at Glendale, Calif., as described in Example 157. The tests were performed using two different flow rates (2 minutes EBCT and 4 minutes EBCT). The effluent concentrations reached an equilibrium concentration at about 55% to 70% of the influent concentration.
Figure 12:
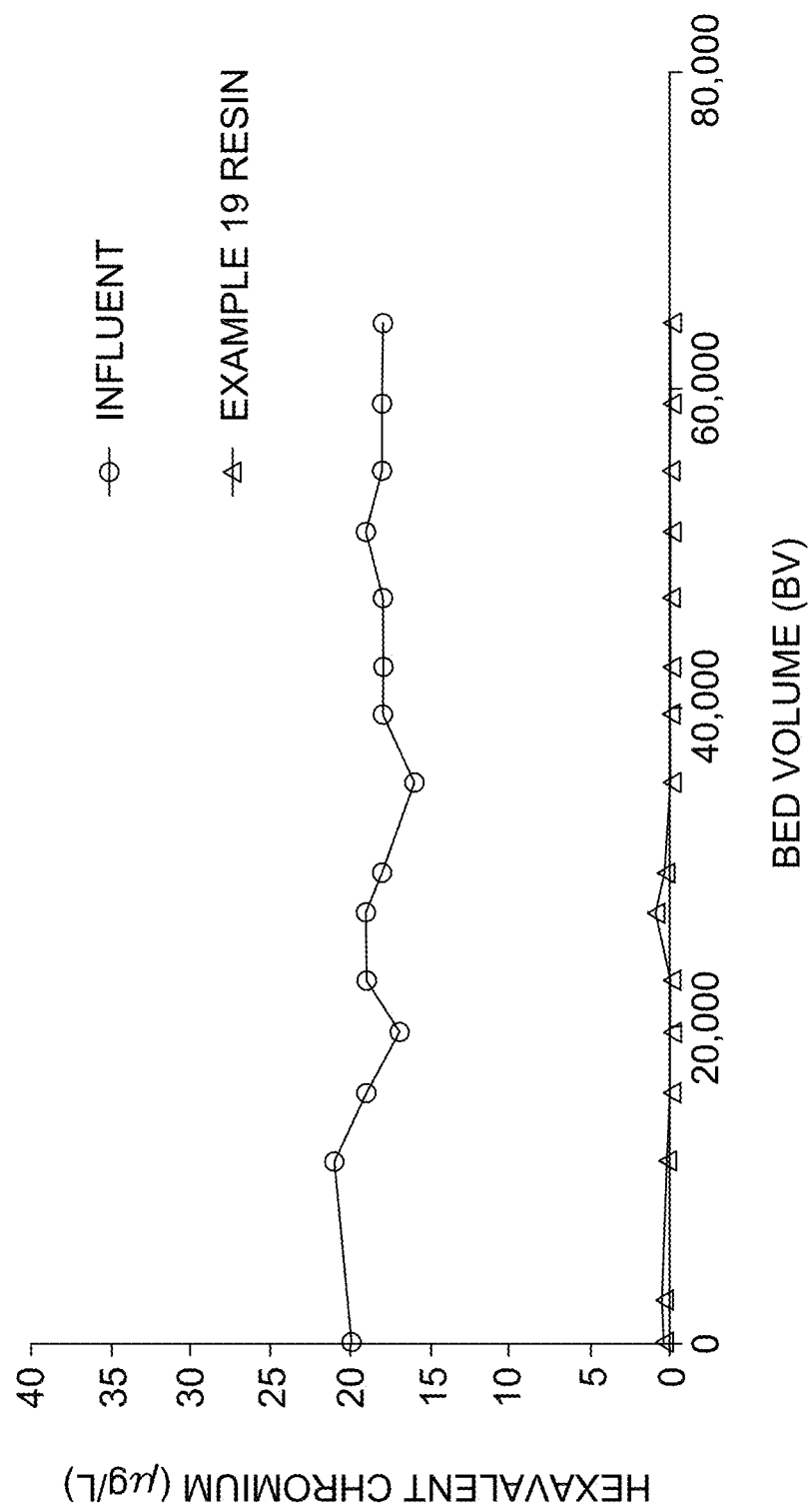
FIG. 12 is a graph illustrating the chromium operating capacity of beads of the present disclosure in groundwater from a well at Glendale, Calif., as described in Example 157.
Figure 13:
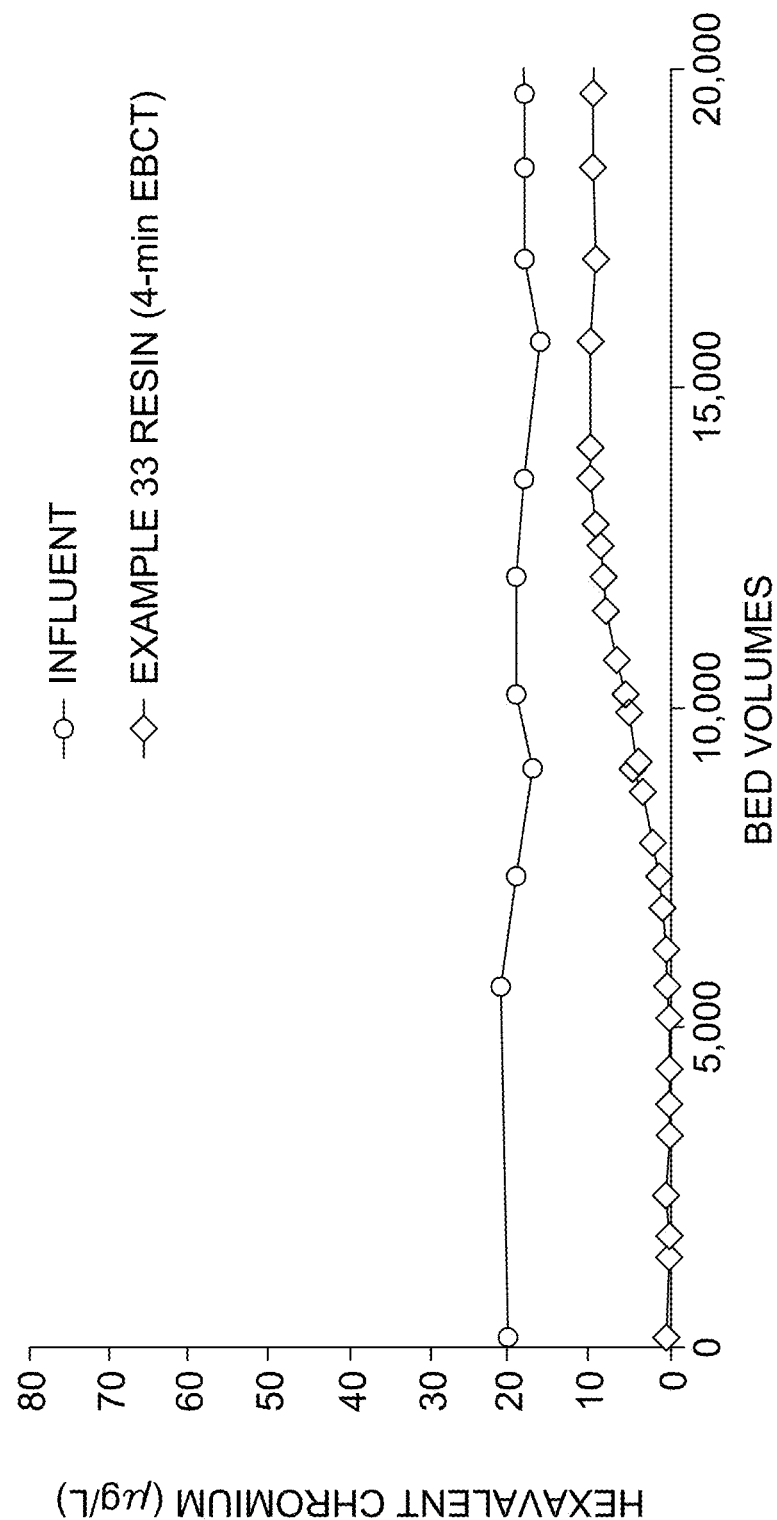
FIG. 13 is an expanded view of the graph of FIG. 11 for the 4 minutes EBCT test, as described in Example 157.

The feeds and effluents were collected periodically and analyzed by a vendor, Eurofines. The effluent chromium concentrations of the two Example 33 bead experiments were plotted against the treated bed volume (BV) as shown in FIG. 11. Both broke through the California MCL (10 ppb) at about 15,000 bed volume. The effluent concentrations also reached an equilibrium concentration at about 55% to 70% of the feed concentration. A plot of the effluent chromium concentration against the treated bed volume for the 4 minute EBCT test is also shown in FIG. 13.

The effluent chromium concentration of the Example 19 bead experiment was also plotted against the treated bed volume (BV) as shown in graphs below. By about 60,000 bed volumes the effluent chromium concentration was still below the California MCL (10 ppb).

This written description provides various examples of particular reagents, process conditions, etc. to disclose the present process and compounds, including the best mode, and also to enable any person skilled in the art to practice the process, including making and using any compound or process, and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Additionally, it is to be understood that particular numerical values recited herein, including for example reagent concentrations or ratios, reaction times, reaction temperatures, and the like, are intended to disclose and encompass all values there between, as well as all ranges that may be created by the selection of any two values thereof. For example, reference to a reaction temperature of "about 20° C., 10° C., about 0° C., or less" is to be understood to encompass reaction temperature ranges of between about 0° C. and about 20° C., between about 0° C. and about 10° C., between about 10° C. and about 20° C., or any two values there between.

With reference to the use of the words "comprise" or "comprises" or "comprising" in this patent application (including the claims), Applicants note that unless the context requires otherwise, those words are used on the basis and clear understanding that they are to be interpreted inclusively, rather than exclusively, and that Applicants intend each of those words to be so interpreted in construing this patent application, including the claims below.

As used herein, reference to "a" or "an" means "one or more." Throughout, the plural and singular should be treated as interchangeable, other than the indication of number. For example, reference to "a compound" includes a single compound as well as one or more additional compounds, and the like.

What is claimed is:

1. A substantially spherical polymeric bead consisting of a reaction product of a cross-linked polyamine and an amine-reacting moiety, wherein
    i) the bead has a crush strength of about 250 g/bead or more; and
    ii) the cross-linked polyamine is a reaction product of a polyamine and an amine-reacting crosslinking agent.
2. The bead of claim 1, wherein:
    the bead has a total capacity of from about 2.0 eq/L to about 4.2 eq/L.
3. A population of beads comprising the bead of claim 1, wherein the beads are about 90% or more whole bead.
4. The bead of claim 1, wherein the diameter of the bead is about 250 μm or more.
5. The bead of claim 4, wherein the diameter of the bead is from about 300 μm to about 1500 μm.
6. The bead of claim 1, wherein the bead has a strong base capacity of at least about 1.5 eq/L.
7. The bead of claim 6, wherein the bead has a strong base capacity of from about 1.5 eq/L to about 2.2 eq/L.
8. The bead of claim 1, wherein from about 5% to about 85% of the total binding capacity of the bead is from strong base sites.
9. The bead of claim 8, wherein from about 15% to about 75% of the total binding capacity of the bead is from strong base sites, and from about 25% to about 85% of the total binding capacity of the bead is from weak base sites.
10. The bead of claim 1, wherein the bead has a degree of permanent quaternization of from about 30% to about 70%.
11. The bead of claim 1, wherein the bead binds an ion selected from the group consisting of chromates, perchlorates, nitrate, and combinations thereof.
12. The bead of claim 1, wherein the bead binds a chromium (VI) ion.

13. The bead of claim 1, wherein the amine-reacting moiety is selected from the group consisting of

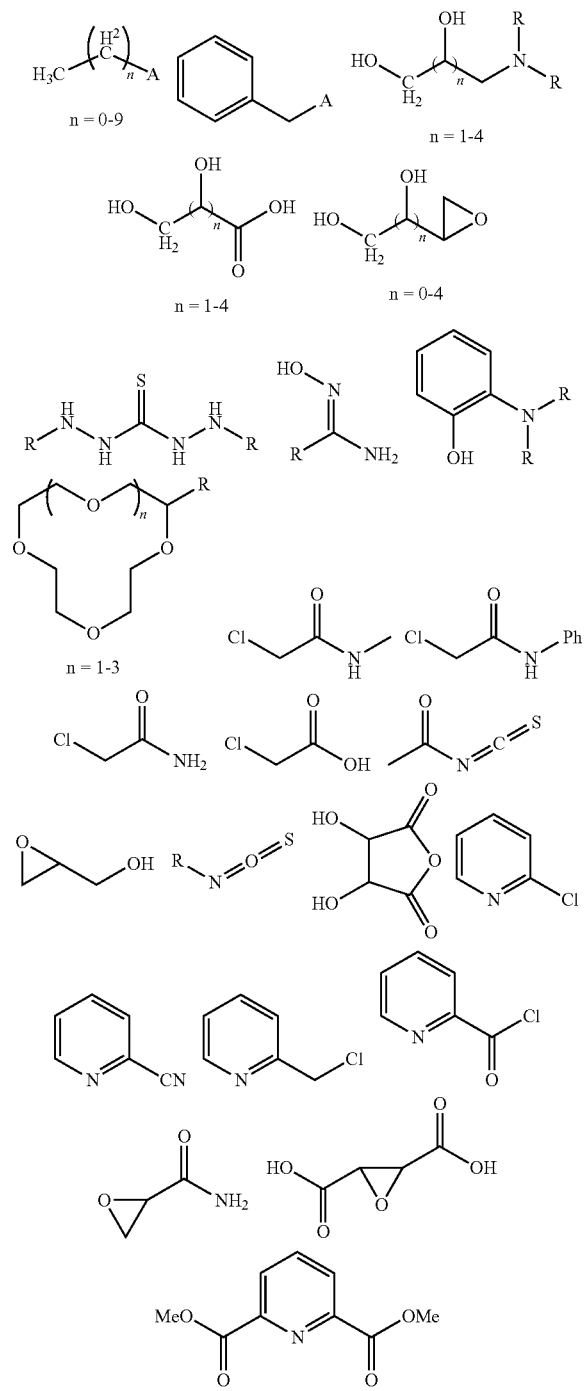

wherein A and R are independently selected from the group consisting of alkyl epoxides, halides, amine, sulfur, isocyanate, carboxylic halides, anhydride, and methyl ester.

14. The bead of claim 1, wherein the polyamine is a polymer.

15. The bead of claim 1, wherein the polyamine is an amine of formula (I):

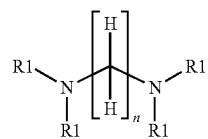

wherein: n is from 2-10; and each $R_1$ is independently selected from the group consisting of H, alkyl, aryl, aminoalkyl, and aminoaryl, or is linked to a neighboring $R_1$ to form an alicyclic, aromatic, or heterocyclic group.

16. The bead of claim 15, wherein the polyamine is selected from the group consisting of

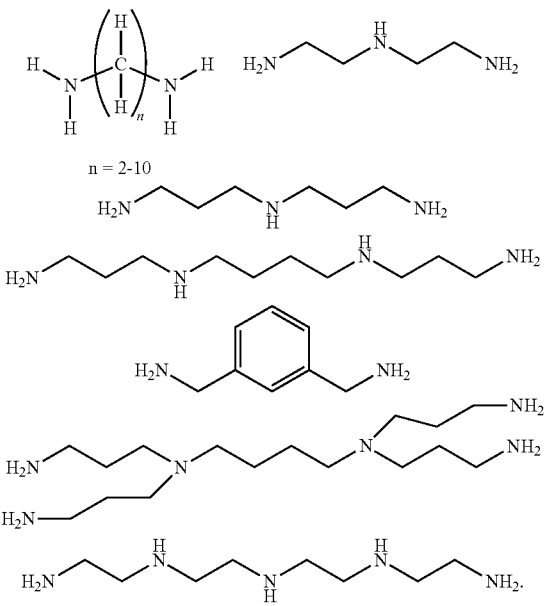

17. The bead of claim 1, wherein the polyamine is a polymer comprising a repeating unit of formula (II):

wherein the polymer is linear or branched; each n, independently, is from 10-2000; and each R is independently selected from the group consisting of H, alkyl, aryl, aminoalkyl, aminoaryl, and an amine of formula (II).

18. The bead of claim 17, wherein the polyamine is selected from the group consisting of linear polyethyleneimine and branched polyethyleneimine.

19. The bead of claim 1, wherein the crosslinking agent is selected from the group consisting of:

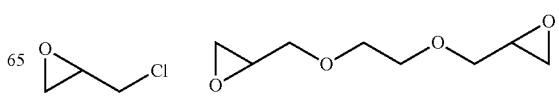

-continued

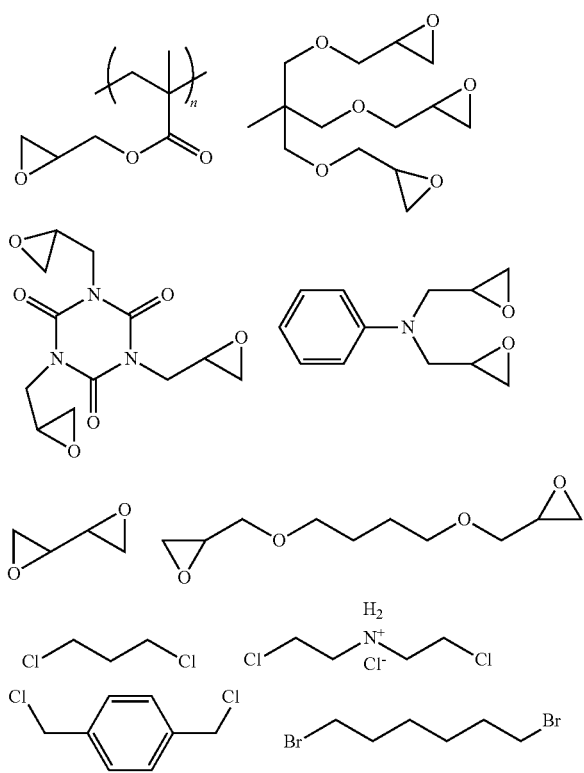

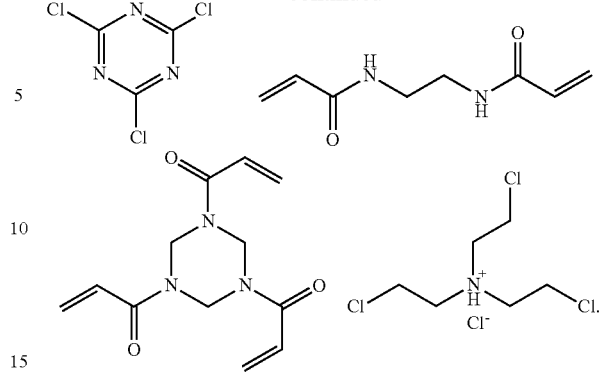

20. The bead of claim 19, wherein the crosslinking agent is epichlorohydrin.

21. A method for removing an ion from an aqueous solution, the method comprising contacting the aqueous solution with a plurality of the beads of claim 1.

22. The method of claim 21, wherein the ion is selected from the group consisting of chromates, perchlorates, and nitrate.

23. The method of claim 21, wherein the ion is a chromium ion.

24. The method of claim 23, wherein the chromium ion is chromium (VI).

25. The method of claim 21, wherein the aqueous solution is contaminated groundwater.

* * * * *